US009405280B2

(12) United States Patent
Ahn et al.

(10) Patent No.: US 9,405,280 B2
(45) Date of Patent: Aug. 2, 2016

(54) NETWORK SYSTEM

(75) Inventors: Junho Ahn, Seoul (KR); Yanghwan Kim, Seoul (KR); Hoonbong Lee, Seoul (KR); Koonseok Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 881 days.

(21) Appl. No.: 13/806,920

(22) PCT Filed: Jun. 27, 2011

(86) PCT No.: PCT/KR2011/004657
§ 371 (c)(1),
(2), (4) Date: Apr. 11, 2013

(87) PCT Pub. No.: WO2011/162584
PCT Pub. Date: Dec. 29, 2011

(65) Prior Publication Data

US 2013/0204444 A1 Aug. 8, 2013

(30) Foreign Application Priority Data

Jun. 26, 2010 (KR) ........................ 10-2010-0060886
Nov. 26, 2010 (WO) .................. PCT/IB2010/003388

(51) Int. Cl.
*G05B 13/02* (2006.01)
*H02J 3/14* (2006.01)
(Continued)

(52) U.S. Cl.
CPC . *G05B 13/02* (2013.01); *H02J 3/14* (2013.01); *H02J 3/28* (2013.01); *H02J 13/0006* (2013.01); *H04L 12/2803* (2013.01); *H04L 12/2816* (2013.01); *H04L 12/2834* (2013.01); *H04L 41/0833* (2013.01); *H02J 2003/143* (2013.01);
(Continued)

(58) Field of Classification Search
CPC ........ G05B 13/02; H02J 3/28; H02J 13/0006; H02J 3/14; H02J 2003/143; H02J 2003/146; H02J 2012/285; H02J 13/006; H04L 12/2803; H04L 12/2816; H04L 12/2834; H04L 41/0833; H04L 2012/285; Y02B 70/325; Y02B 70/3266; Y02B 70/3225; Y02B 90/222; Y02B 90/244; Y02B 90/246; Y04S 20/12; Y04S 20/222; Y04S 20/224; Y04S 20/228; Y04S 20/242; Y04S 20/327; Y04S 20/42; Y04S 40/162
USPC .................................. 700/286, 295, 296, 297
See application file for complete search history.

(56) References Cited

U.S. PATENT DOCUMENTS 5,524,447 A * 6/1996 Shim .................... F25D 17/045 236/91 R
7,062,361 B1 6/2006 Lane
(Continued)

FOREIGN PATENT DOCUMENTS

KR 10-0701110 B1 3/2007
KR 10-2007-0098172 A 10/2007
(Continued)

*Primary Examiner* — Robert Fennema
*Assistant Examiner* — Jennifer L Norton
(74) *Attorney, Agent, or Firm* — Dentons US LLP

(57) ABSTRACT

Provided is a component for a network system, which includes a control part and a power consumer unit. The control part recognizes energy information or additional information except for the energy information. The power consumer unit is controlled to maintain a target value, and is repeatedly turned on or off. An on-period or off-period of the power consumer unit is varied depending on information recognized by the control part.

16 Claims, 15 Drawing Sheets

(51) Int. Cl.
*H02J 3/28* (2006.01)
*H02J 13/00* (2006.01)
*H04L 12/24* (2006.01)
*H04L 12/28* (2006.01)

(52) U.S. Cl.
CPC ..... *H02J 2003/146* (2013.01); *H04L 2012/285* (2013.01); *Y02B 70/325* (2013.01); *Y02B 70/3225* (2013.01); *Y02B 70/3266* (2013.01); *Y02B 90/222* (2013.01); *Y02B 90/244* (2013.01); *Y02B 90/246* (2013.01); *Y04S 20/12* (2013.01); *Y04S 20/222* (2013.01); *Y04S 20/224* (2013.01); *Y04S 20/228* (2013.01); *Y04S 20/242* (2013.01); *Y04S 20/327* (2013.01); *Y04S 20/42* (2013.01); *Y04S 40/162* (2013.01)

(56) References Cited

U.S. PATENT DOCUMENTS

2005/0138929 A1 6/2005 Enis et al.
2007/0010916 A1* 1/2007 Rodgers .................... H02J 3/14 700/295
2007/0239317 A1 10/2007 Bogolea et al.
2008/0172312 A1* 7/2008 Synesiou ............... G06Q 10/00 705/34
2009/0292402 A1* 11/2009 Cruickshank, III .... G06Q 10/00 700/287
2010/0092625 A1* 4/2010 Finch ..................... G06Q 50/06 426/231
2010/0146712 A1* 6/2010 Finch ..................... G06Q 50/06 8/137
2010/0174668 A1* 7/2010 Finch ..................... G06Q 50/06 705/412
2010/0175719 A1* 7/2010 Finch ..................... G06Q 50/06 134/18
2011/0098869 A1* 4/2011 Seo ........................ G01D 4/004 700/296
2011/0175742 A1* 7/2011 Shin ...................... F25D 17/065 340/635

FOREIGN PATENT DOCUMENTS

KR 1020070098172 A 10/2007
KR 10-2009-0046543 A 5/2009
KR 1020090046543 A 5/2009
WO 9922284 A1 5/1999
WO 03084022 A1 10/2003
WO 2010031025 A1 3/2010

* cited by examiner

NETWORK SYSTEM

This application is a 35 USC §371 National Stage entry of International Application No. PCT/KR2011/004657 filed on Jun. 27, 2011, and claims priority of Korean Application No. 10-2010-0060886 filed on Jun. 26, 2010 and PCT/IB/2010/003388 filed on Nov. 26, 2010, all of which are incorporated by reference in their entirety herein.

BACKGROUND

The present disclosure relates to a network system.

Providers simply provide energy sources such as electricity, water, and gas, and consumers simply use the supplied energy sources. This makes it difficult to effectively manage the production, distribution and use of energy. Therefore, a network system for effectively managing energy is in need.

SUMMARY

Embodiments provide a component for a network system, which effectively manages an energy source.

In one embodiment, a component for a network system includes: a control part that recognizes energy information or additional information except for the energy information; and a power consumer unit controlled to maintain a target value, and repeatedly turned on or off, wherein an on-period or off-period of the power consumer unit is varied depending on information recognized by the control part.

In another embodiment, a component for a network system includes: a control part that recognizes energy information or additional information except for the energy information; and a power consumer unit controlled to maintain a target value, wherein a section functions as a control reference to maintain the target value that is in the section, and a width of the section is varied depending on the energy information or additional information recognized by the control part.

In another embodiment, a component for a network system includes: a control part that recognizes energy information or additional information except for the energy information; and a power consumer unit controlled by the control part, wherein an input value that is input for driving the power consumer unit is varied, the number of times that the input value exceeds a preset reference value is equal to or greater than a predetermined number, and the number of times that the input value exceeds the preset reference value for a specific time period is decreased depending on recognized information.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

Figure 1:
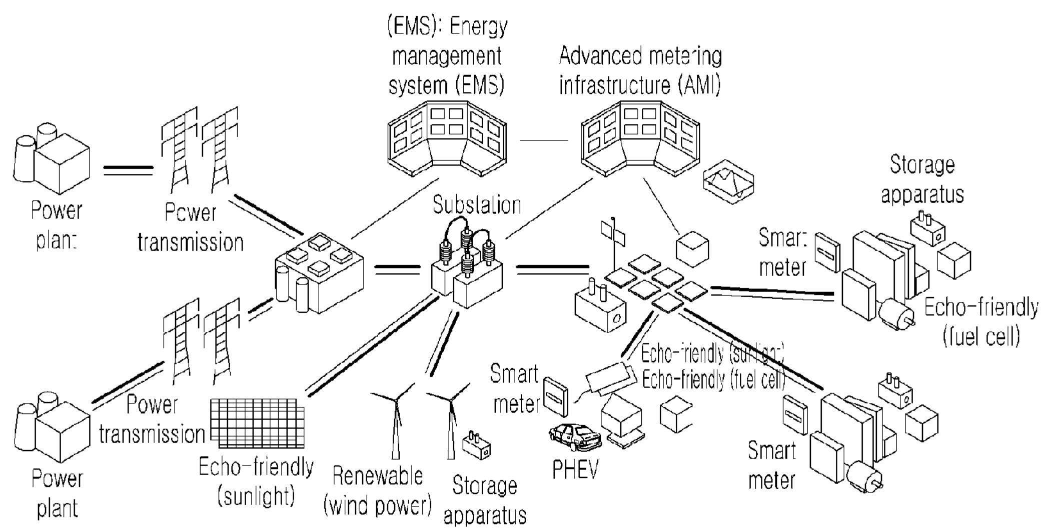
FIG. 1 is a view schematically showing an example of a network system according to the present disclosure.

FIG. 1 is a view schematically showing an example of a network system according to the present disclosure.

The network system is a system for managing an energy source such as electricity, water or gas. The energy source means one of which amount generated or used can be metered. Therefore, even a source not mentioned above may be used as the energy source. Hereinafter, electricity will be described as an example of the energy source, and details of this specification may be identically applied to other energy sources.

Referring to FIG. 1, a network system according to an embodiment includes a power plant for producing electricity. The power plant may include a power plant for producing electricity through a thermal power generation or nuclear power generation and a power plant using water power, sunlight power, wind power or the like which is eco-friendly energy.

The electricity produced in the power plant is transmitted to a sub-control center through a power transmission line, and the sub-control center transmits the electricity to a substation so that the electricity is distributed to customers such as houses or offices.

Electricity produced by the eco-friendly energy is also transmitted to the substation so as to be distributed to each of the customers. The electricity transmitted from the substation is distributed to each of the offices or houses through electricity power storage, or is directly distributed to each of the offices or houses.

In a house using a home area network (HAN), electricity may be produced by itself through sunlight, fuel cells built in a plug-in hybrid electric vehicle (PHEV), or the like. Also, the produced electricity may be stored or distributed, or surplus electricity may be resold to the outside world.

The network system may include a smart meter for detecting the amount of electricity used in each customer (house, office or the like) in real time, and an advanced metering infrastructure (AMI) for metering the amount of electricity used in a plurality of customers.

The network system may further include an energy management system (EMS) for managing energy. The EMS may generate information on operations of one or more components with respect to energy (production of energy, distribution of energy, usage of energy, storage of energy, and the like). The EMS may generate at least a command for the operations of the components.

In this specification, a function or solution performed by the EMS may be referred to as an energy management function or energy management solution.

In the network system, one or more EMSs may be provided as a separate configuration, or the EMS may be included as an energy management function or energy management solution in one or more components.

Figure 2:
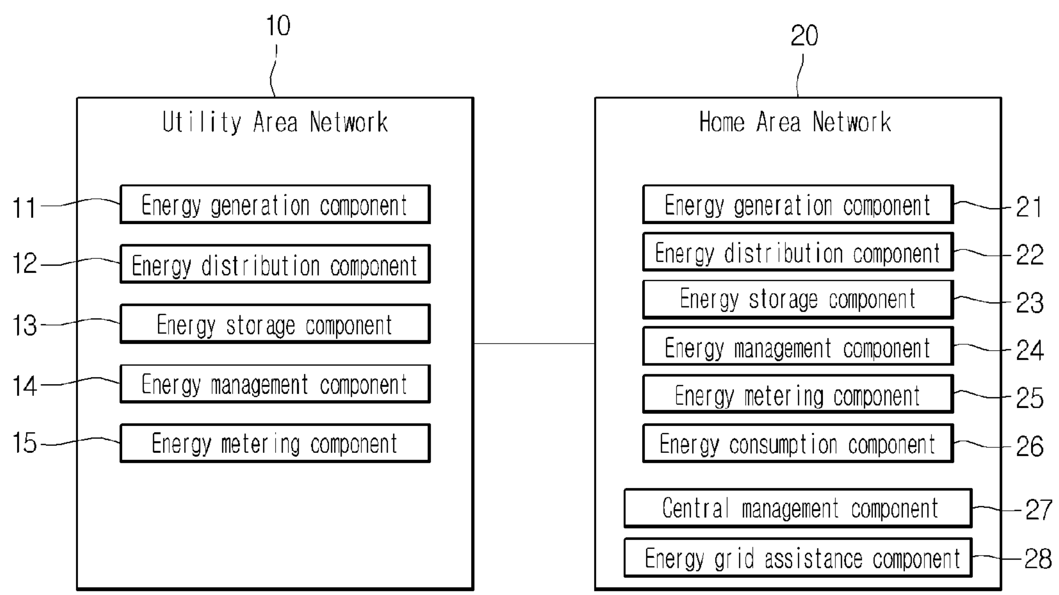
FIG. 2 is a block diagram schematically showing an example of the network system according to the present disclosure.

FIG. 2 is a block diagram schematically showing an example of the network system according to the present disclosure.

Referring to FIGS. 1 and 2, the network system according to the present disclosure is configured by a plurality of components. For example, the components of the network system are a power plant, a substation, a sub-control center, an EMS, electric home appliances, a smart meter, a storage battery, a web server, an AMI, a home server, and the like.

In the present disclosure, each of the components may be configured by a plurality of sub-components. As an example, in a case of one component is an electric home appliance, sub-components may be a microcomputer (MICOM), a heater, a display and the like. That is, all that perform a specific function may be components in the present disclosure, and such components constitute the network system of the present disclosure. Two components may communicate with each other by means of a communication unit. One network may be one component or may be configured by a plurality of components.

In this specification, the network system in which communication information is related to an energy source may be referred to as an energy grid.

A network system according to an embodiment may include a utility area network (UAN) 10 and a home area network (HAN) 20. The UAN 10 and the HAN 20 may perform wired or wireless communication by means of a communication unit, and may perform two-way communication.

In this specification, the term "home" means not only a household as a lexical meaning but also a group in which specific components such as buildings or companies gather. Also, the term "utility" means a group in which specific components outside the home gather.

The UAN 10 includes an energy generation component 11 for generating energy, an energy distribution component 12 for distributing or transmitting energy, an energy storage component for storing energy, an energy management component 14 for managing energy, and an energy metering component 15 for metering information related to energy.

In a case where one or more components that constitute the UAN 10 consume energy, the components that consume the energy may be energy consumption components.

The energy consumption component is a component corresponding to the energy consumption component 26 that constitutes the HAN 20. The energy consumption component may be the same component as the energy consumption component 26 or may be another component distinguished from the energy consumption component 26.

The energy generation component 11 may be a power plant as an example. The energy distribution component 12 distributes or transmits energy generated in the energy generation component 11 and/or energy stored in the energy storage component 13 to the energy consumption component 26 that consumes the energy. The energy distribution component 12 may be a power transmitter, substation, sub-control center, or the like.

The energy storage component 13 may be a storage battery, and the energy management component 14 generates information for driving one or more of the energy generation component 11, the energy distribution component 12, the energy storage component 13 and the energy consumption component 26, related to energy. The energy management component 14 may generate at least a command for the operation of a specific component.

The energy management component 14 may be an EMS. The energy metering component 15 may meter information related to the generation of energy, the distribution of energy, the usage of energy, the storage of energy, and the like. The energy metering component 15 may be an AMI as an example. The energy management component 14 may be a separate configuration, or may be included in another component as an energy management function.

The UAN 10 may communicate with the HAN 20 by a terminal component (not shown). That is, information generated or transferred in a specific component that constitutes the UAN may be transmitted to the HAN 20 through the terminal component, or information generated or transferred in another component that constitutes the HAN 20 may be received to the UAN 10 through the terminal component. The terminal component may be a gate way as an example. The terminal component may be provided to one or more of the UAN 10 and the HAN 20.

The terminal component may be a component necessary for transmitting/receiving information between the UAN and the HAN.

Two components that constitute the UAN 10 may communicate with each other by means of a communication unit.

The HAN 20 includes an energy generation component 21 for generating energy, an energy distribution component 22 for distributing energy, an energy storage component 23 for storing energy, an energy management component 24 for managing energy, an energy metering component 25 for metering information related to energy, an energy consumption component 26 for consuming energy, a central management component 27 for controlling a plurality of components, and an energy grid assistance component 28.

The energy generation component 21 may be a home power generator, and the energy storage component 23 may be a storage battery. The energy management component 24 may be an EMS. As an example, the energy generation component 21 may be a solar cell, a fuel cell, a wind power generator, a power generator using subterranean heat, a power generator using seawater, or the like.

The energy storage component 23 may perform storage using energy generated from the energy generation component 21. Therefore, in view of the use of energy, the energy storage component 23 and the energy generation component 11 may be an energy using component that uses energy together with the energy consumption component 26. That is, the energy using component may include at least an energy consumption component, an energy generation component and an energy storage component. In a case where the energy management component uses energy, it may be included in the energy using component.

In view of the supplied energy, the energy storage component 23, the energy consumption component and the energy generation component 11 may be an energy supplied component to which energy is supplied.

The energy metering component 25 may meter information related to the generation of energy, the distribution of energy, the usage of energy, the storage of energy, and the like. The energy metering component 25 may be a smart meter as an example. The energy consumption component 26 may be, as an example, an electric home appliance or a heater, motor, display or the like, which constitutes the electric home appliance. In this embodiment, there is no limitation in the kind of the energy consumption component 26.

Although not shown, the network system may include an accessory component or a consumable handling component. The accessory component may be an energy network-only component which performs an additional function for the energy network. For example, the accessory component may be an energy network-only weather reception antenna.

The consumable handling component may be a component for storing, supplying, and transferring a consumable and confirms and recognize information about the consumable. For example, the consumable may be a product or material which is used or handled during the operation of the component. Also, the consumable handling component may be managed in the energy network, e.g., the energy management component. For example, the consumable may be a washing cloth of a washing machine, a cooking item of a cooking appliance, or a detergent for cleaning the washing cloth in the washing machine, or a fiber conditioner, or seasoning for cooking item.

Figure 3:
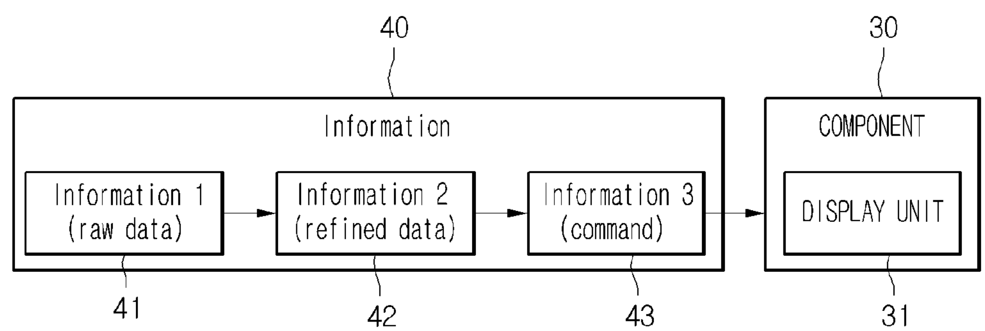
FIG. 3 is a block diagram showing an information transmission process on the network system according to the present disclosure.

FIG. 3 is a block diagram showing an information transmission process on the network system according to the present disclosure.

Referring to FIG. 3, in the network system according to the present disclosure, a specific component 30 may receive information related to energy (hereinafter, referred to as energy information 40) by means of a communication unit. The specific component 30 may further receive additional information (environment information, time information and the like) by means of the communication unit. In this instance, the information may be received from another component. That is, at least energy information is contained in the received information.

The specific component 30 may be a component that constitutes the UAN 10 or a component that constitutes the HAN 20.

As described above, the energy information 40 may be one of information related to electricity, water, gas and the like. Hereinafter, information related to electricity will be described as an example of the energy information, but information related to other energy sources may be identically applied.

For example, the kind of information related to the electricity may include time-based pricing, curtailment, grid emergency, grid reliability, energy increment, operation priority, and the like.

The information may be divided into scheduled information previously produced based on previous information, and real-time information changed in real time. The scheduled information and the real-time information may be divided by whether or not predict information after the current time (in the future).

The energy information 40 may be transmitted/received as a true or false signal such as a Boolean signal on the network system, or may be transmitted/received as a real price. Alternatively, the energy information 40 may be transmitted/received by being divided into a plurality of levels.

The energy information 40 may be divided into time of use (TOU) information, critical peak pattern (CPP) information or real time pattern (RTP) information according to the change in the pattern of data with respect to time.

According to the TOU information, a data is changed step by step depending on time. According to the CPP information, a data is changed step by step or in real time depending on time, and emphasis is displayed at a specific point of time. According to RTP information, a data is changed in real time depending on time.

In a case where the energy information is time-based pricing information as an example, the time-based pricing information is changed. The time-based pricing information may be transmitted/received as a true or false signal such as a Boolean signal on the network system, or may be transmitted/received as a real price. Alternatively, the time-based pricing information may be transmitted/received by being divided into a plurality of levels.

In a case where the specific component 30 receives a true or false signal such as a Boolean signal, one signal may be recognized as an on-peak signal, and the other signal may be recognized as an off-peak signal.

Alternatively, the specific component 30 may recognize information on at least one drive, which contains the time-based information, and may recognize an on-peak or off-peak signal by comparing the value of the recognized information with the value of reference information.

For example, in a case where the specific component 30 recognizes information divided into levels or real pricing information, it recognizes an on-peak or off-peak signals by comparing the value of the recognized information with the value of reference information.

In this case, the value of the information on drive may be at least one of time-based pricing, electric energy, the variation of time-based pricing, the variation of electric energy, the average of time-based pricing and the average of electric energy. The value of reference information may be at least one of an average, the average between maximum and minimum values of power information during a predetermined period of time and the reference variation of power information during the predetermined period of time (e.g., the slope of consumed electric energy per unit time).

The value of reference information may be determined in real time or may be previously determined. The value of reference information may be determined on the UAN or may be determined on the HAN (a customer's direct input or an input from the energy management component, the central management component or the like).

In a case where the specific component 30 (e.g., the energy consumption component) recognizes an on-peak signal (e.g., at a point of time of recognition), an output may be determined as zero (stop or maintenance of a stop state) or may be decreased. If necessary, the output may be restored or increased. The driving scheme of the specific component may be previously determined before the specific component is operated, or may be changed when the specific component recognizes an on-peak signal posterior to the start of operation.

Alternatively, in a case where the specific component recognizes an on-peak signal (e.g., at a point of time of recognition), the output is maintained under an operable condition. In this case, the operable condition means that the value of the information on drive is less than a predetermined reference. The value of the information on drive may be time-based pricing, consumed electric energy, operation time, or the like. The predetermined reference may be a relative or absolute value.

The predetermined reference may be determined in real time or may be previously determined. The predetermined reference may be determined on the UAN or may be determined on the HAN (a customer's direct input or an input from the energy management component, the central management component or the like).

Alternatively, in a case where the specific component 30 recognizes high-cost information, the output of the specific component may be maintained or increased when the difference between a state information value and a reference value is within a predetermined range. For example, in a case where a compressor of a refrigerator is not operated in a low-cost section, the temperature of a cool chamber or freezing chamber is increased. Therefore, the compressor is necessarily turned on when the temperature of the cool chamber or freezing chamber approaches a reference temperature. In a case where a high-cost section comes after the compressor is turned on, the compressor maintains a current output when the difference between the temperature of the cool chamber or freezing chamber and the reference temperature is within a predetermined range. In a case where a user selects a button for cancelling power saving in the state that the specific component 30 recognizes the high-cost information, the output of the specific component may be maintained.

Alternatively, in a case where the specific component recognizes an on-peak signal (e.g., at a point of time of recognition), the output may be increased. However, although the output is increased at the point of time when the specific component recognizes the on-peak signal, the total output amount of the specific component during the entire drive period may be decreased or maintained as compared with that when the specific component is operated at a normal output level. Alternatively, although the output is increased at the point of time when the specific component recognizes the on-peak signal, the total consumed power or total time-based pricing of the specific component during the entire operation period may be decreased as compared that when the specific component is operated at a normal output level.

In a case where the specific component 30 recognizes an off-peak signal (e.g., at a point of time of recognition), the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output (change in the state of cool air that is a medium for performing the function of the refrigerator). In a case where the specific component is a washing machine or washer, hot water may be stored by driving a heater earlier than the time when the heater is to be operated (storage of hot water that is an additional medium for performing the function of the washing machine or washer). Alternatively, in a case where the specific component is a refrigerator, cool air may be stored in a separate supercooling chamber by increasing an output as compared with the existing output. Alternatively, in a case where the specific component recognizes an off-peak signal (e.g., at a point of time of recognition), electricity may be stored.

The curtailment information is information related to a mode in which the specific component is stopped or a small amount of time-based pricing is taken. As an example, the curtailment information may be transmitted/received as a true or false signal such as a Boolean signal on the network system.

If the specific component 30 recognizes curtailment information, the output may be determined as zero (stop or maintenance of a stop state) or may be decreased as described above.

The grid emergency information is information related to a power failure or the like. As an example, the grid emergency information may be transmitted/received as a true or false signal such as a Boolean signal on the network system. The information related to a power failure or the like has a relation with the reliability of a component using energy.

In a case where the specific component 30 recognizes grid emergency information, it may be immediately shut down.

The grid reliability information is information related to the supply amount of electricity supplied or information related to the quality of electricity. The grid reliability information may be transmitted/received as a true or false signal such as a Boolean signal on the network system, or may be determined by a component (e.g., an electric home appliance) through the frequency of AC power supplied to the component.

That is, if a frequency lower than the frequency of AC power supplied to the component is sensed, it may be determined that the amount of electricity supplied is small (information on the deficiency of the amount of electricity supplied). If a frequency higher than the frequency of AC power supplied to the component is sensed, it may be determined that the amount of electricity supplied is large (information on the excess of the amount of electricity supplied).

In a case where the specific component recognizes shortage of the amount of electricity or poor quality of electricity in the grid reliability information, an output may be determined as zero (stop or maintenance of a stop state) or may be decreased. If necessary, the output may be restored or increased.

On the other hand, in a case where the specific component recognizes the information on the excess of the amount of electricity supplied, the output may be increased, or the operation may be converted from an off-state to an on-state.

The energy increment information is information related to a state that surplus electricity is generated because the amount of electricity used by a component is less than that of power generation. As an example, the energy increment information may be transmitted/received as a true or false signal such as a Boolean signal on the network system.

In a case where the specific component 30 recognizes energy increment information, the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case where the specific component 30 is the energy storage component 13 or 23, the energy storage component 13 or 23 may store electricity by receiving the electricity supplied from the UAN, for example, when electricity storage cost is smaller than a predetermined value.

However, in a case where the energy storage component is connected to the energy generation component 21 that constitutes the HAN, it may continuously store energy generated by the energy generation component 21 until the electricity storage is completed. That is, the energy generated while the energy generation component 21 generates energy may be stored in the energy storage component 23.

The presence of completion of the electricity storage is determined while the energy storage component 13 or 23 stores electricity. In a case where the electricity storage is completed, the electricity supply for the electricity storage is cut off. Specifically, the presence of completion of the electricity storage may be determined using a sensor that senses the voltage, temperature or current of the energy storage component 13 or 23. The cutoff of the electricity supply may be performed using a switch (or circuit breaker) provided to a supply stage through which the electricity is supplied to the energy storage unit 13 or 23.

The electricity storage cost may be cost consumed in the electricity storage for a specific time period or electricity cost at a specific time.

As an example, in a case where the electricity storage cost is in an off-peak section (in a case where the specific component recognizes low-cost information which will be described later), the energy storage component 13 or 23 may store electricity. Alternatively, in a case where an on-peak section corresponds to an allowance section (in a case where the specific component recognizes high-cost information which will be described later), the energy storage component 13 or 23 may store in the on-peak section. In this instance, the allowance section is a section in which a power consumption information value is less than a predetermined reference. The power consumption information value may be a electricity cost, a power consumption amount, a time range, or the like. The predetermined reference may be a predetermined cost, a predetermined power consumption amount, a predetermined time, or the like. The predetermined reference may be a relative value or absolute value, and may be changed automatically or manually.

The energy storage component 13 or 23 may store a counter electromotive force generated when an energy consumption component that is rotatably operated or a motor provided to the energy consumption component is stopped (rotated).

Alternatively, the energy storage component 13 or 23 may store electricity using an energy consumption component that is rotatably operated or a motor provided to the energy consumption component. For example, in a case where the energy consumption component is a refrigerator, the energy storage component 13 or 23 may store electricity generated when a fan motor provided to the refrigerator is rotated (the fan motor may serve as a power generator or may be connected to the power generator). Alternatively, in a case where the energy consumption component is a washing machine, the energy storage component 13 or 23 may store electricity generated when a motor that rotates a drum for accommodating the laundry is rotated. In a case where the energy consumption component is a cooking appliance, the energy storage component 13 or 23 may store electricity generated when a motor for rotating a cooling fan is rotated. In a case where the energy consumption component is an air cleaner, the energy storage component 13 or 23 may store electricity generated when a motor for rotating a fan is rotated. That is, in this embodiment, in a case where a motor is provided regardless of the kind of the energy consumption component, the energy storage component 13 or 23 may store electricity generated when the motor is rotated. Alternatively, in a case where a power generator is connected to a fan rotated by the flow of air (natural flow or forcible flow), the energy storage component 13 or 23 may store electricity generated by the power generator.

The electricity stored in the energy component 13 or 23 may be supplied to one or more energy consumption components 26. In a case where electricity cost is higher than a reference value, the electricity stored in the energy component 13 or 23 may be supplied to the energy consumption component 26. As an example, in a case where the electricity cost is an on-peak (in a case where the specific component recognizes the high-cost information), the electricity stored in the energy storage component 13 or 23 may be supplied to the energy consumption component 26. In a case where the electricity cost is an off-peak (in a case where the specific component recognizes the low-cost information) but is close to the on-peak, the electricity stored in the energy storage component 13 or 21 may be supplied to the energy consumption component. If the electricity stored in the energy storage component 13 or 23 is less than a predetermined value, electricity generated in the energy generation component 11 is supplied to the energy consumption component. Thus, it is possible to prevent the operation of the energy consumption component from being stopped due to the cutoff of the electricity supply while the energy consumption component is operated.

In a case where the supply of electricity generated in the energy generation component 11 is cut off by interruption of electric power, the electricity stored in the energy component 13 or 23 may be supplied to the energy consumption component. In a case where the energy consumption component is an electric product, the electricity stored in the energy storage component 13 or 23 may be supplied to a communication unit or control unit provided to the electric product.

The electricity stored in the energy component 13 or may be supplied to a portion of a plurality of energy consumption components. As an example, the stored electricity may be supplied to an electric product such as a refrigerator required in continuous operation among a plurality of electric products. Alternatively, the stored electricity may be supplied to an energy consumption component with relatively low power among a plurality of energy consumption components that constitute one electric product. It will be apparent that the stored electricity is supplied to an energy consumption component with high power. Alternatively, when a course using a relatively small amount of power is performed among a plurality of courses in which an electric product is performed, the stored electricity may be supplied. It will be apparent that the stored electricity may be supplied even when a course using a large amount of power is performed.

Meanwhile, in a case where electricity is generated and stored by a fan or motor as described above, the electricity stored in the energy storage component 13 or 23 may be supplied to an energy consumption unit with relatively low power. As an example, the electricity stored in the energy storage component 13 or 23 may be supplied to an LED lamp, a display, a control unit, a communication unit, a low-power heater, or the like. Alternatively, in a case where the energy consumption component performs a plurality of courses, the electricity stored in the energy storage component 13 or 23 may be supplied to the energy consumption component in a course that requires low power.

The energy storage component 23 may be built in connected to one energy consumption component. Alternatively, a plurality of energy storage components 23 may be built in or connected to a plurality of energy consumption components, respectively. Alternatively, a plurality of energy storage components 23 may be built in or connected to one energy consumption component. The plurality of energy storage components 23 may be connected to one another to share the stored electricity.

Among the information related to energy, the on-peak information, the curtailment information and information on the deficiency of the amount of electricity supplied may be recognized as high-cost information considered that energy cost is relatively expensive. In this instance, the section in which the high-cost information is recognized by the specific component may referred to as a low-cost section.

On the other hand, among the information related to energy, the off-peak information, the energy increment information and the information on the excess of the amount of electricity supplied may be recognized as low-cost information considered that energy cost is relatively cheap. In this instance, the section in which the low-cost information is recognized by the specific component may be referred to as a low-cost section.

The information related to the fluctuation of the energy cost (high-cost or low-cost information) may be recognized as information for determining a power saving driving scheme of the specific component (e.g., the energy consumption component). That is, the information related to the fluctuation of the energy cost may be recognized by dividing a time slot (time period) based on energy cost or pricing period (pricing zone) for determining a driving scheme of the specific component into at least two or more.

A high period means a high price time period (period of high cost) or a high pricing period and a low period means a low price time period (period of low cost) and a low pricing period.

As an example, in a case where the information related to energy is recognized as a Boolean signal, the time slot (time period) based on energy cost or pricing period (pricing zone) for determining a driving scheme of the specific component may be divided into two. In a case where the information related to energy is divided into a plurality of levels or recognized as real-time information, the time period or pricing period may be divided into three or more.

Meanwhile, the information related to energy cost corresponding to at least time may be recognized as information for determining a power saving driving scheme of the specific component. That is, the information related to energy cost may be recognized by dividing a time slot (time period) or pricing zone (time period) into at least two or more. As described above, the divided time period or pricing period may be determined based on the kinds of the recognized information (the Boolean signal, the plurality of levels and the real-time information).

In other words, the information related to fluctuation of energy cost may be recognized by dividing a determination factor for driving the specific component into two or more, and functions on time and energy cost may be included in the determination factor.

In a case where the information related to energy cost is divided into two levels or more, the driving scheme of the specific component may be determined according to the information divided into levels.

On the other hand, in a case where the recognized information related to energy cost is not divided based on a specific reference (e.g., real-time cost information), it is compared with predetermined information, and the driving scheme of the specific component may be determined based on the compared result.

Here, the predetermined information may be reference information (e.g. reference value) for dividing the information related to energy cost, and the compared result may be whether not the information related to energy cost is more or less than the reference value.

Specifically, each of the kinds of information related to energy may be divided into first information 41 that is raw information, second information 42 that is refined information, and third information 43 that is information for performing the function of the specific component. That is, the first information is a raw data, the second information is a refined data, and the third information is a command for performing the function of the specific component.

The information related to energy is included a signal, and the signal is transmitted. In this instance, one or more of the first to third information may be transmitted several times while the content of the information is not converted but only the signal including the information is converted.

For example, as shown in FIG. 3, a component that receives a signal including the first information may convert only the signal and transmit a new signal including the first information to another component.

Therefore, it is described in this embodiment that the conversion of signal is a different concept from the conversion of information. In this instance, it can be readily understood that when the first information is converted into the second information, the signal including the first information is also converted into the signal including the second information.

However, the third information may be transmitted several times in the state that the content of the third information is converted or in the state that only the signal including the third information is converted while the content of the third information is identically maintained.

Specifically, in a case where the first information is raw information on time-based pricing, the second information may be refined information on the time-based pricing. The refined information on the time-based pricing is information in which the time-based pricing is divided into a plurality of levels or analysis information. The third information is a command generated based on the second information.

The specific component may generate, transmit or receive one or more of the first to third information. The first to third information are not necessarily transmitted or received in sequence. Only a plurality of pieces of third information without the first and second information may be transmitted in sequence or parallel. Alternatively, the first and third information may be transmitted or received together, the second and third information may be transmitted or received together, or the first and second information may be transmitted or received together.

As an example, in a case where the specific component receives the first information, it may transmit the second information or may transmit the second and third information.

In a case where the specific information receives only the third information, it may generate and transmit new third information.

Meanwhile, in the relation between two pieces of information, one is a message and the other is a response for the message. Thus, each of the components that constitute the network system may transmit or receive a message. In a case where each of the components receives a message, it may respond to the message. Therefore, in the case of an individual component, the transmission of a message is a relative concept with the response for the message.

The message may include a data (first or second information) and/or a command (third information).

The command (third information) may include a command for storing the data, a command for generating the data, a command for processing the data (including the generation of an additional data), a command for generating an additional command, a command for transmitting the additionally generated command, a command for transmitting a received command, and the like.

In this specification, the response for the received message means storage of the data, processing of the data (including generation of an additional data), generation of a new command, transmission of the newly generated command, simple transmission of a received command (including generation of a command for transmitting the received command to another component), operation, transmission of the stored information, transmission of an acknowledge message (acknowledge character or negative acknowledge character), or the like.

For example, in a case where the message is first information, the specific component that receives the first information may generate second information by processing the first information, or may generate the second information and new third information, as a response for the message.

The specific component that receives the message may provide a response related to energy. Here, the term "response" may be understood as a concept including an operation through which the specific component can perform a function. As an example, the HAN 20 may perform an operation related to energy by receiving a message.

The response (operation) related to energy, provided by the specific component, will be described in detail. For example, the specific component may be an energy consumption component.

The energy consumption component may be driven so that the energy cost when it is driven based on the recognition for energy information is reduced as compared with that when it is driven without the recognition for energy information.

The specific component may include a plurality of modes in which it is driven to perform its own function. The plurality of modes are a first mode and a second mode in which energy cost is relatively saved as compared with that in the first mode. The specific component may be driven in at least one of the first and second modes.

Here, the first mode may be a general mode and the second mode may be a power saving mode. Alternatively, the first and second modes may all be power saving modes.

The general mode may be understood as a mode in which the function of the specific component is performed without recognition of energy information. On the other hand, the power saving mode may be understood as a mode in which the function of the specific component is performed based on the recognition of energy information so as to save energy cost.

In a case where the first and second modes are power saving modes, the first mode may be specified as a driving scheme for saving energy cost and the second mode may be specified as a driving scheme in which the energy cost in the second mode is more saved than that in the first mode.

Meanwhile, in a case where the specific component (e.g., the energy consumption component) is driven, at least a portion is recognized in a driving scheme including at least drive time and course. In this case, an unrecognized portion may be generated so as to save energy cost, and a recognized portion may be converted into another scheme.

For example, at least a portion of the driving scheme may be recognized under the control of the energy management component, the control of the energy consumption component, or the like. In a case where a specific driving scheme is further required so as to save energy cost, an unrecognized portion of the driving scheme may be newly generated, and a recognized portion may be converted into another scheme so as to save energy.

It will be apparent that the process of generating the unrecognized portion may be omitted. In this case, the process of converting the recognized portion into another scheme. On the other hand, the process of converting the recognized portion into another scheme may be omitted. In this case, the process of newly generating the unrecognized portion may be performed.

The drive time may include a drive start time or drive end time. The course may include a drive period of the specific component and the power of the specific component.

The generated scheme or converted scheme may be a scheme recommended by the specific component so as to save energy cost. Here, the specific component may be an energy consumption component (control component) or the energy management component.

As an example, in a case where the recognized scheme is a specific drive time, the specific drive time may be converted into another time so as to save energy cost, and a specific course may be generated.

On the other hand, in a case where the recognized scheme is a specific course, the specific course may be converted into another course so as to save energy cost, and a specific time may be generated.

Under the control described above, a change in time or power may be made with respect to the output function of the specific component based on time.

The generated scheme or converted scheme may be performed within a set range. That is, in the process of recognizing at least a portion of the driving scheme, the generation or conversion of the driving scheme may be performed within a predetermined reference in which the recognized portion appears (e.g., restriction set by a user, constraint set under the control of the energy management component or energy consumption component, or the like).

Therefore, in a case where the set range is out of the predetermined reference, it is restricted to generate the unrecognized portion or to convert the recognized portion into another scheme.

Another embodiment is proposed.

Cost information may further included in the recognized driving scheme. That is, in a case where the cost information is recognized, a portion related to the drive time or course may be generated. The generated driving scheme may be recommended.

Meanwhile, a response of the specific component based on the information related to the fluctuation of the energy cost (high-cost or low-cost information), e.g., a power control for power saving driving, may be performed. An output decrease (including an output of zero) or output increase may be included in the output control.

It is as described above that the output is decreased or zero, maintained or increased based on the recognition for the information (on-peak or off-peak) related to energy cost.

If high-cost information is recognized, the output may be zero or decreased. Specifically, the output in the recognition of the high-cost information may be decreased as compared with that in the recognition of low-cost information. As described above, the decrease of the output may be previously determined before the specific component is operated, or may be changed when the high-cost information is recognized posterior to the start of the operation of the specific component.

In a case where the output of the specific component is zero or decreased, the function to be performed by the specific component may be lost as compared with a normal case. Therefore, a response for restoring the lost function may be performed.

As an example, after the output of the specific component is decreased, the specific component may be controlled so that the total operation time of the specific component is increased or so that the output is increased in at least a time period.

In other words, if specific reference information related to energy information is recognized in a period after the output of the specific component is controlled, the response for controlling the output may be released. Here, the term "period" may be divided based on a point of time when the high-cost information is recognized.

The total operation time may be understood as a time approaching a specific target in the process of performing the function of the specific component. As an example, in a case where the specific component is an electric appliance (washing machine, drying machine, cooking appliance or the like) intermittently driven (or driven in a specific course), the total operation time may be understood as a time until a corresponding course is completed.

On the other hand, in a case where the specific component is an electric appliance (refrigerator, water purifier, or the like) driven at normal times, the total operation time may be understood as a time approaching a target set for performing the function of the specific component. For example, the set target may be a target temperature, a target amount of ice produced, or a target amount of clean water in the refrigerator.

The total operation time may be increased as compared with the operation time set before the output of the specific component is decreased. In a case where the output of the specific component is not decreased, the total operation time may be increased as compared with the operation time of the specific component. However, although the total operation time of the specific component is increased, the specific component is controlled so that the total energy cost generated through the drive of the specific component can be saved as compared with that when the output of the specific component is not decreased.

If the high-cost information is recognized, the output of the specific component may be increased.

However, although the output is increased at a point of time when the high-cost information is recognized, the total output of the specific component during the entire driving period may be decreased or maintained as compared with that when the specific component is operated under a normal output. Alternatively, although the output is increased at a point of time when the high-cost information is recognized, the total power consumption or total time-based pricing of the specific component during the entire driving period may be decreased as compared with that when the specific component is operated under the normal output.

If the low-cost information is recognized, the output of the specific component may be increased. For example, in a case where the operation reservation of the specific component is set up, the driving of the specific component may be started before the setup time, or a component having a large output in a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case of a specific condition (additional condition) is generated based on the information related to the fluctuation of the energy cost (high-cost or low-cost information), the response of the specific component, e.g., the output control for power saving driving, may be limited. That is, the output of the specific component may be maintained.

Here, the term "limitation" may be understood as the release of the output control performed or not performed.

The specific condition includes a case where influence on energy cost is minute even though the output control of the specific component is not performed or a case where it is necessary to prevent a function to be performed by the specific component from being degraded when the output of the specific component is controlled.

Whether or not the influence on the energy cost is minute may be determined based on a predetermined reference (time-based pricing, power consumption or information on operation time). The predetermined reference may be a relative or absolute value.

The case where the function to be performed by the specific component is degraded may be considered as a case where the specific component is a defrosting heater, for example.

In a case where it is controlled to decrease the output in a high-cost time period and to increase the output in the low-cost time period, the driving of the defrosting heater is more frequently performed than that during a normal time (setup period). In this case, the temperature of a storage room in the refrigerator is increased, and thus, the control of the output can be limited.

Meanwhile, the specific component 30 may include a display unit 31 for displaying information. In this embodiment, the term "information display" means that visual, auditory, olfactory, and tactile information is known to the outside. Also, the display unit 31 may include a touch screen for selecting or inputting information. Alternatively, the specific component 30 may include a separate input unit for inputting information by cable or radio.

All the information (energy information or additional information except the energy information) described above may be displayed on the display unit 31. One of the energy information and additional information may be displayed, or two or more pieces of information may be simultaneously displayed. That is, two or more pieces of information may be simultaneously displayed on the display unit 31. As an example, in a case where two or more pieces of information are simultaneously displayed, any one of the information is selected. Then, the selected screen may be enlarged, and the unselected screen may be reduced. For another example, if any one of the two or more pieces of information is selected, the selected screen may be enlarged, and the unselected screen may be disappear. In a case where specific information is selected and the selected screen is enlarged, information more specific than the previous information or information different from the previous information may be displayed on the enlarged screen. For example, in a case where the selected information is character, graphic information may be displayed on the enlarged screen. Alternatively, two or more pieces of information may be sequentially displayed on the enlarged screen. In a case where two or more pieces of information are displayed on the display unit 31, two or more relative positions may be varied.

Information except energy cost information and energy cost may be displayed on the displayed unit 31. The energy cost information may include current cost, past cost, or estimated cost in the future. The energy cost information may include not only information on cost information in a specific period or time but also information on cost used with respect to the operation of a component, cost used in the present, cost to be used (estimation cost), or the like.

The information except the energy cost information may include information on energy reduction, emergency situation, grid safety, power generation quantity, operation priority, energy consumption, energy supply amount, information (e.g., cost change rate, average cost, level or the like) newly generated based on two or more pieces of information (one or more pieces of energy cost information and/or information except the one or more pieces of energy cost information), and the like. Here, the energy consumption may be energy consumption used two or more home networks, and may be simultaneously or selectively displayed.

The information on energy consumption may include information on past consumption, current consumption and estimated consumption in the future. The information on energy consumption may include information on accumulated consumption for a specific period (time), average consumption, increasing rate of consumption, decreasing rate of consumption, maximum consumption, minimum consumption, and the like.

The additional information may include one or more of environment information, time information, information related to the one or more components, information related to another component, and information related to a user using the one or more components. The environment information may include one or more of information related to carbon dioxide emission rate, concentration of carbon dioxide in air, temperature, humidity, precipitation, presence of rainfall, amount of solar radiation, amount of wind. The time information may include one or more of current time information, time information related to energy, and information related to an operation of the one or more components.

In addition to the information described above, information refined based on at least one information or newly generated information may also be displayed on the display unit 31.

In a case where the specific component 30 is the energy storage component 13 or 23, the presence of use of the stored electricity, the remaining amount of the store electricity and the like may be displayed. If the remaining amount of the stored electricity is less than a predetermined value, alarm information may be displayed.

The information displayed on the display unit 31 may include one or more of information on number, character, sentence, figure, shape, symbol, image and light. The information displayed on the display unit 31 may include one or more of information on graph for each time or period, level, table. One or more of the shape, color, brightness, size, position, alarm period, alarm time of the information displayed on the display unit 31 may be varied.

A currently operable function (or menu) may be displayed on the display unit 31. Alternatively, among a plurality of functions, operable and inoperable function may be divided by size, color, position and the like, and then displayed on the display unit 31. Alternatively, in a case where separate input units are provided, only an input unit for selecting an operable function may be activated, or an input unit for selecting an operable function and an input unit for selecting an inoperable function may be displayed in different colors. The target or display method of information displayed on the display unit 31 may be set and changed by a user, or may be changed automatically.

In a case where a condition for informing the user of information is satisfied, specific information may be displayed on the display unit 31. It will be apparent that a portion of a plurality of pieces of information may be continuously displayed in the state that a component is turned on. The display time of the information may be changed or set automatically or manually.

If specific information (one or more pieces of information) is selected using the input unit, the selected information may be displayed. If a user contacts a portion of a component, e.g., an input unit, a handle, a display or the like, regardless of information display selection, or operates one or more buttons or knobs that constitute the input unit, a portion of the information may be displayed. In this instance, the information to be displayed may be set or changed. It will be apparent that a sensing unit for sensing a user's contact may be provided to the component. Alternatively, the specific information may be displayed by installation environment or variation of outdoor environment. Alternatively, the specific information may be displayed when the specific component receives new information. Alternatively, the specific information may be displayed when the kind or state of the specific component is changed. As an example, if a light emitting unit is turned off in an off-peak section and an on-peak section comes, the light emitting unit may be turned on. Alternatively, the specific information may be automatically displayed when the operation or state of the component is changed. As an example, in a case where the mode of the component is changed, information related to the changed mode may be automatically displayed.

Meanwhile, the display unit 31 may be separably connected or fixed to the component 30. In a case where the display unit 31 is separable from the component 30, it may perform wired or wireless communication with the component 30 (or control unit of the component). In a case where the display unit is fixed to the component 30, it may also perform wired or wireless communication with the component 30.

In a case where the display unit 31 is separable from the component 30, a communication unit and an input unit for inputting or selecting information may be provided to the display unit 31. Thus, information can be inputted or selected through the input unit in the state that the display unit 31 is separated from the component 30. The communication unit may be provided to the component 30, and only the display unit 31 may be separated from the component 30. The display unit 31 may be the energy management component 24, the energy metering component 25 or the central management component 27, or may be a separate control apparatus.

In a case where the display unit 31 is provided with a communication unit, a communication unit may also provided to the component 30. In a case where the display unit 31 and the component 30 are in the state that they are communicated with each other and information is transmitted/receive through a communication signal, the display unit 31 may be used. That is, in a case where the intensity of a signal is secured so that information can be included in the communication signal, the display unit 31 may be in an available state. On the other hand, in a case where the display unit 31 is not communicated with the component 30 or information is not included in the communication signal due to the weak intensity of the signal, the display unit may be in an unavailable state. One of the display unit 31 and the component 30 transmits a communication signal, and the other of the display unit 31 and the component 30 transmits a response signal. The presence of use of the display unit 31 may be determined by the presence of reception of the communication and response signals and the signal intensity. That is, in a case where any one of the display unit 31 and the component 30 does not receive a signal or the intensity of received signal is less than reference intensity, it may be determined that the display unit 31 is unavailable. Any one of the display unit 31 and the component 30 may increase the intensity of a transmission signal until it receives a response signal of which intensity is more than the reference intensity.

Information for informing the user of the presence of use of the display unit 31 may be displayed on the display unit 31 or the component 30. If it is recognized that the display unit 31 is unavailable, the component 30 may be controlled to increase its unique performance, to perform a door locking function or to limit its operation. Alternatively, the power of the component may be off while maintaining the power of a communication apparatus (modem) required for performing communication in the network system. Alternatively, the power of the component may be turned off while maintaining only a memory function for storing the state information of the component.

Meanwhile, sensors may be provided to the respective display unit 31 and component 30 so as to sense the presence of mounting of the display unit 31. As an example, the presence of mounting of the display unit 31 may be determined when the component 30 is operated. Each of the sensors may be a vibration sensor for sensing vibration. If the display unit 31 is mounted on the component 30, vibration generated in the operation of the component 30 can be transferred to the display unit 31. Therefore, in a case where the difference between the values of vibrations respectively sensed by the sensors is less than a predetermined value, it may be recognized that the display unit 31 is mounted on the component 30. If it is recognized that the display unit 31 is mounted on the component 30, the operation of the component 30 may be controlled so that vibration or noise generated in the operation of the component 30 is decreased.

As an example, in a case where the component 30 is a washing machine or drier, the rotation speed of a motor may be decreased. In a case where the component 30 is a refrigerator, the driving period of a compressor may be decreased. On the contrary, if it is recognized that the display unit 31 is separated from the component 30, the component may be controlled to increase its unique performance, to perform a door locking function or to limit its operation.

As another example, each of the sensors may be a temperature sensor. In a case where the difference between the values of temperatures respectively sensed by the sensors is less than a predetermined value, it may be recognized that the display unit 31 is mounted on the component 30.

In the state that the display unit 31 is separated from the component 30, an auxiliary display unit may be provided to the component 30 so as to enable the operation of the component 30. The presence of operation of the auxiliary display unit may be determined based on the presence of use of the display unit 31. As an example, if the display unit 31 is separated from the component 30 or is unavailable, the auxiliary display unit may be turned on.

Figure 4:
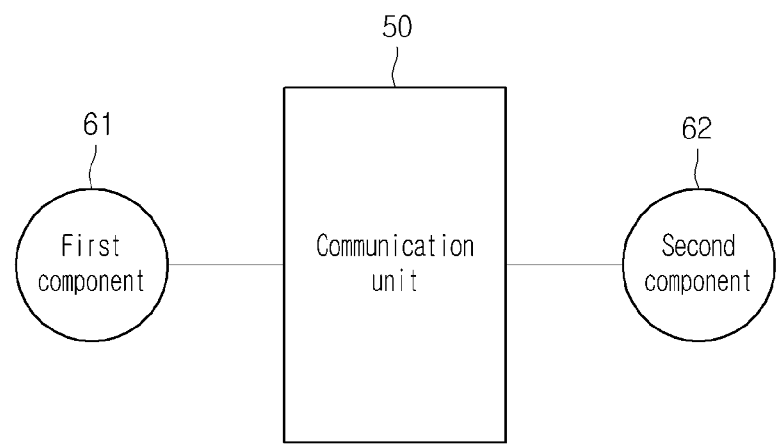
FIG. 4 is a view showing the communication structure of two components that constitute the network system according to a first embodiment.
Figure 5:
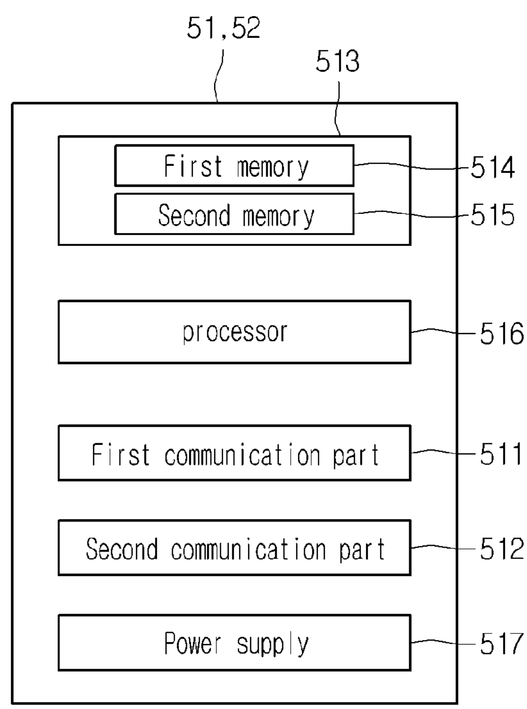
FIG. 5 is a block diagram showing the detailed configuration of a communication device that constitutes a communication unit.

FIG. 4 is a view showing the communication structure of two components that constitute the network system according to a first embodiment. FIG. 5 is a block diagram showing the detailed configuration of a communication device that constitutes a communication unit.

Referring to FIGS. 2, 4 and 5, first and second component 61 and 62 that constitute the network system may perform wired or wireless communication by means of a communication unit 50. The first and second components 61 and 62 may perform unidirectional or bidirectional communication.

In a case where the two components 61 and 62 perform wired communication, the communication unit 50 may be a simple communication line or power line communication means. It will be apparent that the power line communication means may include communicators (e.g., a modem or the like) respectively connected to the two components.

In a case where the two components 61 and 62 perform wireless communication, the communication unit 50 may include a first communicator 51 connected to the first component 61 and a second communicator 52 connected to the second component 62. In this case, the first and second communicators 51 and 52 perform wireless communication with each other.

As an example, if any one of the first and second communicators is powered on, one of the two communicators may transmit a network participation request signal, and the other of the two communicators may transmit a permission signal. As another example, if any one of the first and second communicators is powered on, the powered-on communicator may transmit a network participation request signal to a communicator previously participated in the network, and the communicator that receives the request signal may transmit a permission signal to the powered-on communicator.

In a case where a communicator that recognizes energy information determines that an error occurs in the received information in the state that a specific component participates in the network, the information is re-requested. For example, in a case where the first communicator receives energy information from the second communicator but an error occurs in the received information, the first communicator may request the second communicator to re-transmit the energy information. If the first communicator does not receive normal information for a predetermined time or number of times, it is determined that the first communicator has an error. In this case, information for informing a user of the error may be displayed in the first communicator or the first component 61.

The first component 61 may be a component that constitutes the UAN 10 or a component that constitutes the HAN 20.

The second component 62 may be a component that constitutes the UAN 10 or a component that constitutes the HAN 20.

The first and second components 61 and 62 may be the same kind of component or different kinds of components.

Components may be joined in the UAN 10 or the HAN 20.

Specifically, addresses may be assigned to a plurality of components, e.g., first and second components, respectively. Here, the addresses are necessary for performing communication between the components and can be mapped to at least a group.

The address may be understood as values respectively converted from the unique code of the first or second component. That is, at least a portion of the components that constitute the network system may have an unchangeable/unique code, and the code may be converted into an address for building a network.

In other words, product codes for at least some of the plurality of components capable of constituting first and second networks may be converted into different network codes based on the constituted networks.

As an example, the product code may be a unique code determined in production of electric appliances or a code separately provided for the registration of a network. The product code may be converted into an identity (ID) for identifying a network to which the electric appliance is to be registered.

The first and second networks may be networks that constitute the UAN 10 or networks that constitute the HAN 20. On the other hand, the first and second networks may be the UAN 10 and the HAN 20, respectively. Alternatively, the first and second networks may be the HAN 20 and the UAN 10, respectively.

A first component and a second component for allowing the first component to participate in the network may be included in the plurality of components that constitute the network. For example, the first component may be an electric appliance and the second component may be a server.

Any one of the first and second components transmits a request signal for participating in the network, and the other of the first and second components may transmit a permission signal.

That is, a signal may be transmitted/received between the first and second components, and whether or not to participate in the network may be determined based on the transmission time or number of the signal.

As an example, the first component transmits a test signal to the second component, and it is determined whether or not a response signal from the second component is transmitted to the first component. In a case where the response signal is not transmitted, the first component re-transmits the test signal, and it is re-determined whether or not a response signal from the second component is transmitted to the first component. By repeating such a process, if the transmission number of the test signal exceeds the setting number of the test signal, it may be determined that the second component does not participate in the network.

Meanwhile, the first component may transmit the test signal to the second component. If a response signal from the second component is not transmitted within a setup time, it may be determined that the second component does not participate in the network.

The first and second communicators 51 and 52 may have the same structure. Hereinafter, the first and second communicators 51 and 52 will be referred to as a communicator 51 and 52.

The communicator 51 and 52 may include a first communication part 511 for communication with the first component 61, a second communication part 512 for communication with the second component 62, a memory 513 for storing information received from the first component 61 and information received from the second component 62, a processor 516 for performing information processing, and a power supply 517 for supplying power to the communicator 51 and 52.

Specifically, the communication language (or scheme) of the first communication part 511 may be identical to or different from that of the second communication part 512.

Two kinds of information respectively received from the two components may be stored in the memory 513. The two kinds of information may be stored in a single sector or may be respectively stored in sectors. In any case, an area in which the information received from the first component 61 may be referred to as a first memory 514, and an area in which the information received from the second component 62 may be referred to as a second memory 515.

The processor 516 may generate first information or generate second and third information based on information received from the component or another communicator.

As an example, in a case where the communicator 51 and 52 receives the first information, it may generate information or sequentially generate the information and the second information by processing a data. Alternatively, in a case where the communicator 51 and 52 receives the first information, it may generate the second and third information by processing a data. In a case where the communicator 51 and 52 receives the third information, it may new third information.

For example, in a case where the second component is an energy consumption component (electric home appliance, component that constitutes the electric home appliance, or the like), the second communicator may generate a command for reducing energy consumption. In a case where the second component is an energy generation component, energy distribution component or energy storage component, the second communicator 52 may generate a command for energy generation time, generation amount, energy distribution time, distribution amount, energy storage time, storage amount or the like. In this case, the second communicator 52 serves as an energy management component.

The power supply 517 may receive electricity supplied from the components 61 and 62 or may receive electricity supplied from a separate power source. Alternatively, the power supply 517 may be a battery or the like.

Figure 6:
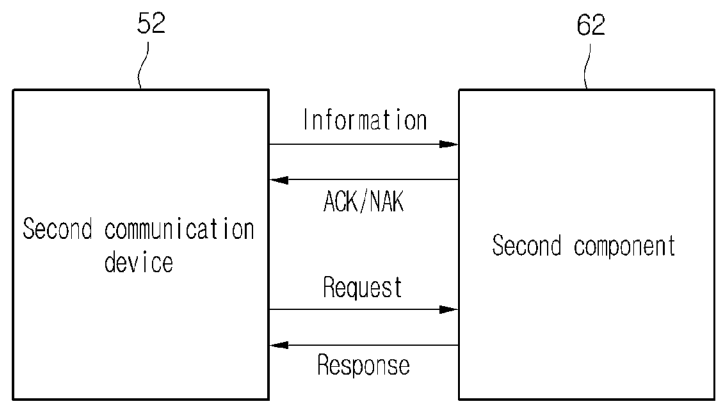
FIG. 6 is a view showing a communication performing process between a specific component and a communication device according to the first embodiment.

FIG. 6 is a view showing a communication performing process between a specific component and a communication device according to the first embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 6, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

The information received from the first communicator is stored in the memory 513. The second communicator 52 transmits a message to the second component 62 as a response for the message. In this instance, the message transmitted to the second component 62 relates to new information different from the information previously stored in the memory 513, or information generated in the processor 516.

Then, the second component 62 transmits an acknowledge character (ack) or negative acknowledge character (Nak) to the second communicator 52 as a response for the message. The second component 62 performs a function (generation of a command, operation, or the like) based on the received information, or waits for performing the function.

Meanwhile, the second communicator 52 requests component information to the second component 62 in real time or by periods. As an example, the component information may be component state information or information on a component unique code, a manufacturer, a service name code, an electricity use amount, and the like. Then, the second component 62 transmits component information to the second communicator 52 as a response for the request. The component information is stored in the memory 513 of the second communicator 52.

If the second communicator 52 receives a message for requesting the component information from the first communicator 51, it transmits the component information stored in the memory 513 to the first communicator 51 as a response for the message. Alternatively, the second communicator 52 transmits the component information stored in the memory 513 to the first communicator 51 in real time or by periods.

The second communicator 52 may transmit the information of the first component, stored in the memory, to the first component together with the information received from the first component. Alternatively, the second communicator 52 may transmit the information of the first component, stored in the memory, to the first component, separately from transmitting the information received from the first component.

The second communicator 52 stores the information of the second component 62 in the memory 513. Hence, in a case where the second communicator 52 receives a message for requesting the component information from the first communicator 51, it transmits the component information stored in the memory 513 directly to the first communicator 51 without a request for information to the second component 62, and thus, the communication load of the second component 62 can be reduced. That is, the second component becomes a virtual component.

Figure 7:
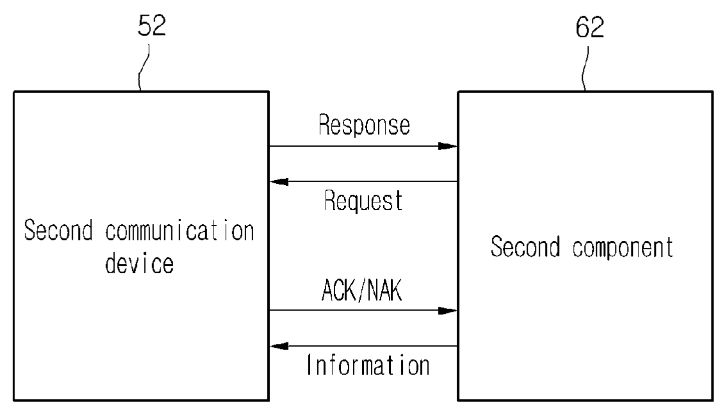
FIG. 7 is a view showing a communication performing process between a specific component and a communication device according to a second embodiment.

FIG. 7 is a view showing a communication performing process between a specific component and a communication device according to a second embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 7, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

If the second communicator 52 receives a message for requesting information from the second component 62, it transmits a message to the second component 62 as a response for the message for requesting the information. In this instance, the message transmitted to the second component 62 relates to new information different from the information previously stored in the memory 513, or information generated in the processor 516. Alternatively, the information transmitted to the second component 62 may be information received from the first component.

The second component 62 performs a function based on the received information or waits for performing the function.

Meanwhile, the second component 62 transmits component information to the second component 62 in real time or by periods. As an example, the component information may be component state information or information on a component unique code, a manufacturer, a service name code, an electricity use amount, and the like.

As described above, the electric use amount may be detected by the smart meter. In a case where the electricity use amount is included in the information of the second component 62, the correction of an actual electricity use amount may be performed by comparing the information of the second component 62 with the information of the smart meter.

Then, the second communicator 52 stores the information of the second component 62 in the memory 513, and transmits an acknowledge character (ack) or negative acknowledge character (Nak) to the second component 62 as a response for the message.

If the second communicator 52 receives a message for requesting component information from the first communicator 51, it transmits the information of the second component 62, stored in the memory 513, to the first communicator 51 as a response for the message. Alternatively, the second communicator 52 the information of the second component 62, stored in the memory 513, to the first communicator 51 in real time or by periods.

The second communicator 52 stores the information of the second component 62 in the memory 513. Hence, in a case where the second communicator 52 receives the message for requesting the component information from the first communicator 51, it transmits the information stored in the memory 513 directly to the first communicator 51 without transmitting a request for information to the second component 62, and thus, the communication load of the second component 62 can be reduced. That is, the second communicator 52 becomes a virtual component.

<Applications>

In the following descriptions, the first and second components may be reversed to each other, and therefore, overlapping descriptions will be omitted. For example, in a case where the first component is an electric home appliance and the second component is an energy management component, description in a case where the first component is an energy management component and the second component is an electric home appliance will be omitted.

Information transmitted/received by each of the components may be all the information described above. Particularly, specific information may be transmitted/received for each of the components.

The energy generation components 11 and 21 may transmit/receive information related to energy generation amount, and the like. The energy distribution components 12 and 22 may transmit/receive information related to energy distribution amount, distribution time, and the like. The energy storage components 13 and 23 may transmit/receive information related to energy storage amount, storage time, and the like. The energy metering components 15 and 25 may transmit/receive information related to energy consumption amount, and the like. The energy management components 14 and 24 may transmit/receive information related to energy generation, distribution, storage, consumption, cost, reliability, emergency situation, and the like.

(1) Case where Second Component is One Component of HAN

The second component 62 may be an energy consumption component 26, e.g., a heater, motor, compressor, display or the like. In this case, the first component 61 may be a MICOM or energy consumption component 26 as an example. The MICOM or energy consumption component 26 may transmit a message for reducing energy consumption to another energy consumption component 26. Then, the another energy consumption component 26 may perform an operation for reducing energy, for example.

As another example, the energy consumption component 26 may be an electric home appliance. In this case, the first component 61 may be an energy storage component 23, an energy consumption component 26 (electric home appliance), an energy management component 24, an energy metering component 25, a central management component 27, a web server component 28, or a component that constitutes the UAN 10.

In this instance, an energy management function may be included or not included in the first component 61 except the energy management component 24.

In a case where an energy management function or solution is not included in the first component 61, it may be included in the communication unit or may be included in the MICOM of the second component 62. In this case, the energy management function is related to the consumption of energy.

As still another example, the second component 62 may be an energy generation component 21, an energy distribution component 22 or an energy storage component 23. In this case, the first component 61 may be an energy management component 24, a central management component 27, a web server component 28 or a component that constitutes the UAN 10.

A message may be transmitted to the second component 62. Here, the message may include energy generation time, generation amount or the like, energy distribution time, distribution amount or the like, and energy storage time, storage amount or the like.

In this instance, an energy management function may be included or not included in the first component 61 except the energy management component 24.

In a case where an energy management function or solution is not included in the first component 61, it may be included in the communication unit. In this case, the energy management function is related to the generation, distribution and storage of energy.

As still another example, the second component may be an energy metering component 25. In this case, the first component 61 may be a central management component 27, a web server component 28 or a component that constitutes the UAN 10.

An energy management function may be included or not included in the energy metering component. In a case where the energy management function is included in the energy metering component 25, the energy metering component 25 performs the same operation as the EMS.

In a case where an energy management function or solution is included in the energy metering component 25, it may be included in the communication unit or may be included in the second component 62.

As still another example, the second component 62 may be a central management component 27. In this case, the first component 61 may be a web server component 28 or a component that constitutes the UAN 10.

(2) Case where Second Component is One Component of UAN

The first component 61 may be a component that constitutes the UAN 10. In this case, the first and second components 61 and 62 may be the same kind of component or different kinds of components.

An energy management function may be included in the first component 61, the second component 62 or the communication unit.

The energy management function included in a specific component or the energy management function included in the energy management component 14 may be related to generation amount, distribution amount, storage amount, energy use amount of a component that constitutes the HAN 20.

In this specification, an example capable of constituting the network system has been described. However, any component not mentioned in this specification may be a first or second component that performs communication through the communication unit. For example, an automobile may be a second component, and the energy management component 24 may be a first component.

(3) Case where One of First and Second Components Communicates with Third Component Although the communication between two components has been described in the aforementioned examples, each of the first and second components may perform communication with one or more components (a third component to an n-th component).

In this case, the relation of the first or second component that performs communication with the third component and the like may be one of the aforementioned examples.

For example, the first component may be a component that constitutes the UAN, the second component may be an energy management component 24 that communicates with the first component, and the third component may be an energy consumption component 26 that communicates with the second component. In this instance, one or more of the three components may communicate with another component.

In this specification, the first to n-th components may be components that constitute the UAN or components that constitute the HAN. Alternatively, a portion of the components may be components that constitute the UAN, or another portion of the components may be components that constitute the HAN.

Hereinafter, third and fourth embodiments will be described. A difference between these embodiments and the aforementioned embodiments will be mainly described, and descriptions and reference numerals will be quoted to elements of these embodiments identical to those of the aforementioned embodiments.

Figure 8:
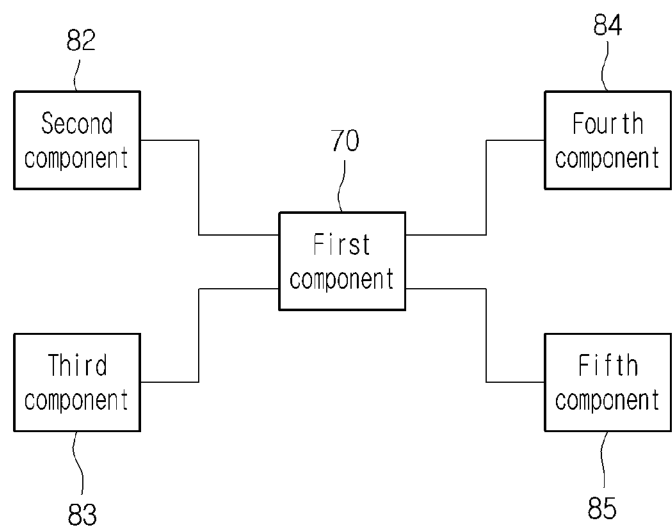
FIG. 8 is a view showing the communication structure of components that constitute the network system according to a third embodiment.
Figure 9:
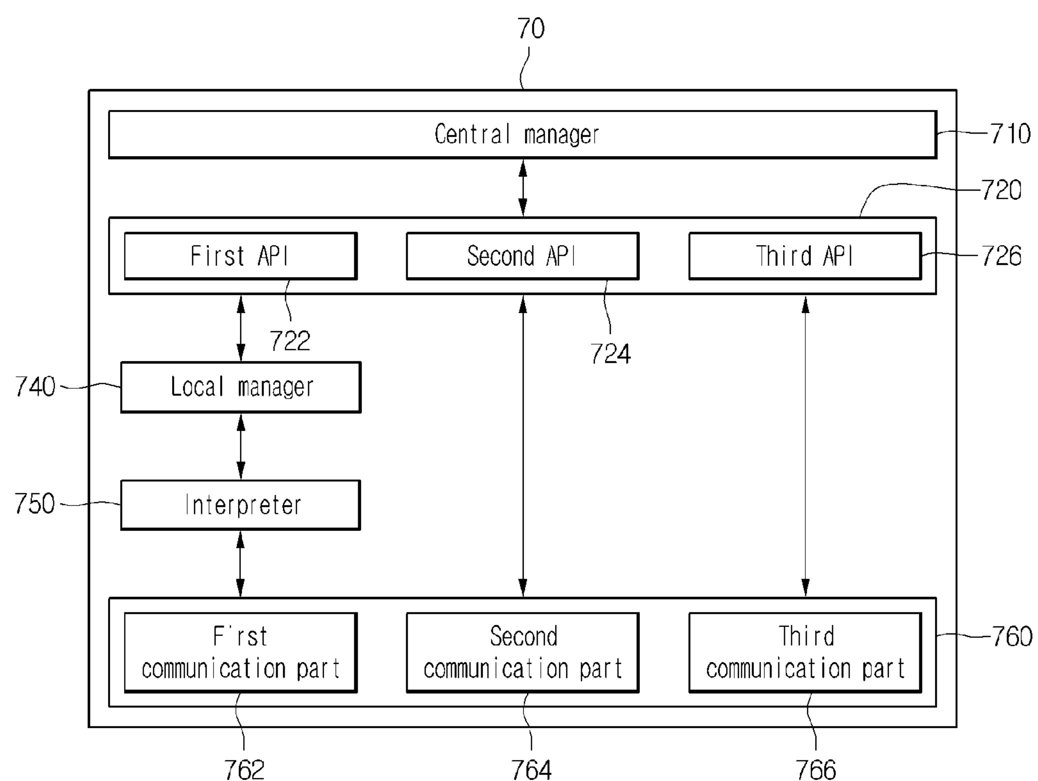
FIG. 9 is a block diagram showing the detailed configuration of a first component in FIG. 8.

FIG. 8 is a view showing the communication structure of components that constitute the network system according to a third embodiment. FIG. 9 is a block diagram showing the detailed configuration of a first component in FIG. 8.

Referring to FIGS. 8 and 9, a first component 70 may communicate with second to fifth components 82, 83, 84 and 85. Hereinafter, it will be described as an example that the first component 70 is a central management component (home server), the second and third components 82 and 83 are energy consumption components (electric home appliances), the fourth component 84 is an energy metering component (smart meter), and the fifth component 85 is a component that constitutes the UAN. The components may communicate with each other by means of a communication unit. In the network system illustrated in FIG. 8, each of the components is directly connected to the first component 70 to communicate with the first component 70. However, in a case where each of the components 82, 83, 84 and 85 is connected to new components to communicate with the new components, the network system may be extended and operated by the new components.

The second and third components 82 and 83 may be the same kind of component or different kinds of components. In this embodiment, it will be described as an example that the second and third components 82 and 83 are different kinds of energy consumption components.

The first component 70 may simply transmit information received from the fourth component 84 and/or the fifth component 85 to the second component 82 and/or the third component 83, or may process the received information and transmit the processed information.

The first component 70 may simply transmit information received from the second component 82 and/or the third component 83 to the fourth component 84 and/or the fifth component 85 (a signal may be converted), or may process the received information and transmit the processed information (the information is converted.

The first component 70 includes a communication unit 760 for performing communication with another component, a central manager 710 for managing the entire operation and/or information processing of the first component, and an application programming interface 720 (hereinafter, referred to as an API) for performing an interface between the communication unit 760 and the central manager 710 (specifically, application software).

The communication unit 760 includes a first communication part 762 for performing communication with the second and third components 82 and 83, a second communication part 764 for performing communication with the fourth component 84, and a third communication part 766 for performing communication with the fifth component 85.

In this instance, the first and second communication parts 762 and 764 may use different communication protocols from each other. As an example, the first communication part 762 may use Zigbee and the second communication part 764 may use Wi-fi. In this embodiment, the kind of communication protocol or method used by the first and second communication parts 762 and 764 is not limited. The third communication component 766 may use Internet communication as an example.

The API 720 includes a first API 722, a second API 724 and a third API 726. The third API 726 is an interface between the central manager 710 and the third communication part 766, and the first API 722 is an interface between the first communication part 762 and the central manager 710. The second API 724 is an interface between the second communication part 762 and the central manager 710.

The first component 70 further includes a local manager 740 and an interpreter 750. In a case where the information to be transmitted/received between the API 720 and the communication unit 760 is information related to operations of energy consumption components (electric home appliances), the local manager 740 outputs information corresponding to the respective energy consumption components. The interpreter 750 interprets information transmitted from the local manager 740 to the communication unit 760 or information received in the communication unit 760. The information outputted from the interpreter 750 is used to set or get values of information related to the respective energy consumption components.

The local manager 740 includes a memory (not shown) in which information related to one or more energy consumption components is stored. Alternatively, the local manager 740 may be connected to a memory in which information related to one or more energy consumption components is stored. The information related to each of the energy consumption components may include operation information of each of the energy consumption components and information for controlling the energy consumption components. The information related to each of the energy consumption components may further include software download information for operating each of the energy consumption components and information for remote controlling/monitoring.

As an example, in a case where a plurality of energy consumption components include a washing machine, a refrigerator and a cooking appliance, information related to each of the energy consumption components is stored in the memory. The information related to each of the energy consumption components may be changed as components connected to the network system are changed.

If a signal is transmitted from the API 720 to the local manager 740, information corresponding to a specific energy consumption component is outputted. In a case where a plurality of energy consumption components exist, information on the plurality of energy consumption components is outputted. The interpreter 750 interprets the information transmitted from the local manager 740 into a machine language so as to transmit the information to the energy consumption components. The machine language may be a signal used to set or get the operation information of the energy consumption components.

The information transmission process in the first component 70 will be described.

As an example, the first component 70 may receive energy information (e.g., an energy reduction signal: first command) from the forth component 45 through the second communication part 764. The received energy information is transmitted to the central manager 710 through the second API 724. In the process of information transmission between the second API 724 and the central manager 710, only a signal including the information is converted, and the content of the information is not converted.

Since the energy information is information related to the energy consumption reduction of the energy consumption components, the central manager 710 transmits information (second command) related to operations of the energy consumption components to the API 720. As an example, the central manager 710 transmits information necessary for turning off power of the washing machine or refrigerator.

Then, the information is transmitted from the first API 722 to the local manager 740.

The local manager 740 transmits information (third command) for controlling the operation of each of the energy consumption components to the interpreter 750 based on the information transmitted from the first API 722. As an example, in a case where the information transmitted from the first API 722 is information having different kinds of energy consumption components as targets, the local manager 740 transmits information related to the control of each of the energy consumption components to the interpreter 750. In this case, since the local manager 740 receives the second command and outputs the third command, the information inputted to the local manager 740 is converted and outputted by the local manager 740.

Subsequently, the interpreter 750 interprets the information transmitted from the local manager 740 into a machine language (signal). Then, the converted signal is transmitted to the target energy consumption components (second and third components) through the first communication part 762. Then, the energy consumption components (second and third components) are finally turned off so as to reduce energy.

Although it has been described above that the first component receives information through the second communication part, the first component may receive information through the third component so that the information related to the energy consumption components is outputted.

Meanwhile, the second and third components 82 and 83 may transmit their own operation information to the first component 70. Since the information transmitted from the second and third components 82 and 83 is information related to operations of the energy consumption components, the signal received in the first communication part 762 is transmitted to the central manager 710 via the interpreter 750, the local manager 760 and the first API 722. In such an information transmission process, the information related to the second and third components 82 and 83 is stored in the local manager 740. In this embodiment, since the information related to the energy consumption components is stored in the local manager, the local manager may be understood as a virtual energy consumption component (abstraction model).

The central manager 710 may transmit the received information to the second communication part 764 and/or the third communication part 766.

The operation of the first component will be described. The information received through the communication unit 760 may be transmitted directly to the API 720, or may be converted (via the interpreter and the local manager) and then transmitted to the API 720, based on the kind of information (or the type of signal).

The information transmitted from the central manager 740 may be transmitted directly to the communication unit 760, or may be converted and then transmitted to the communication unit 760.

As another example, the interpreter may be included in the local manager 740, and the information received through the communication unit 760 is transmitted to the local manager 740. However, converted information may be outputted, or information may be outputted as it is without converting the information.

Meanwhile, in a case where the information transmitted to the API 720 through the second or third communication part 764 or 766 is information (raw data or refined data) related to time-based pricing, the central manager 710 determines the presence of on-peak time. In the case of the on-peak time, the central manager 710 may transmit the information (first command) for controlling the operations of the energy consumption components to the API 720. Then, the information is converted through the local manager 740, and the converted information (second command) is transmitted to the energy consumption components through the first communication part 762. Alternatively, the central manager 710 may transmit the information related to the time-based pricing to the first communication part 762 through the second API 724 without determining the presence of on-peak time. In this case, the information may be converted or not converted. That is, in a case where the central manager directly receives first information (raw data), it may transmit the first information as it is, or convert the first information into a second information (refined data) and then transmit the second information.

Figure 10:
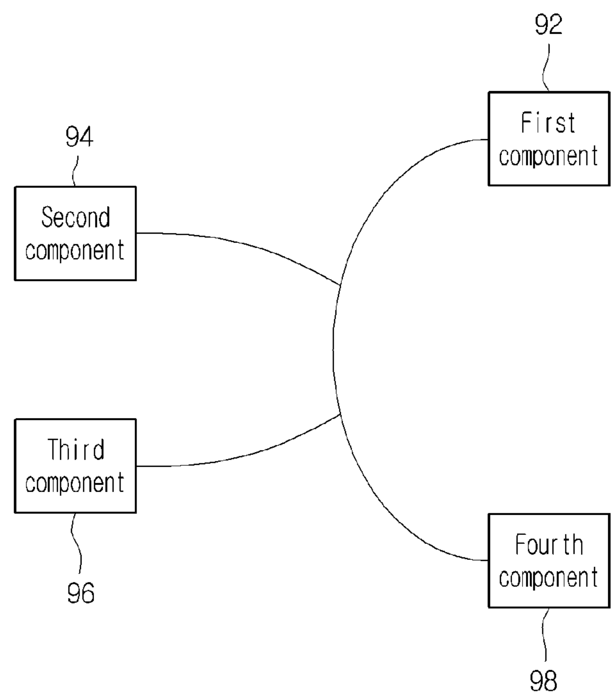
FIG. 10 is a view showing the communication structure of components that constitute the network system according to a fourth embodiment.
Figure 11:
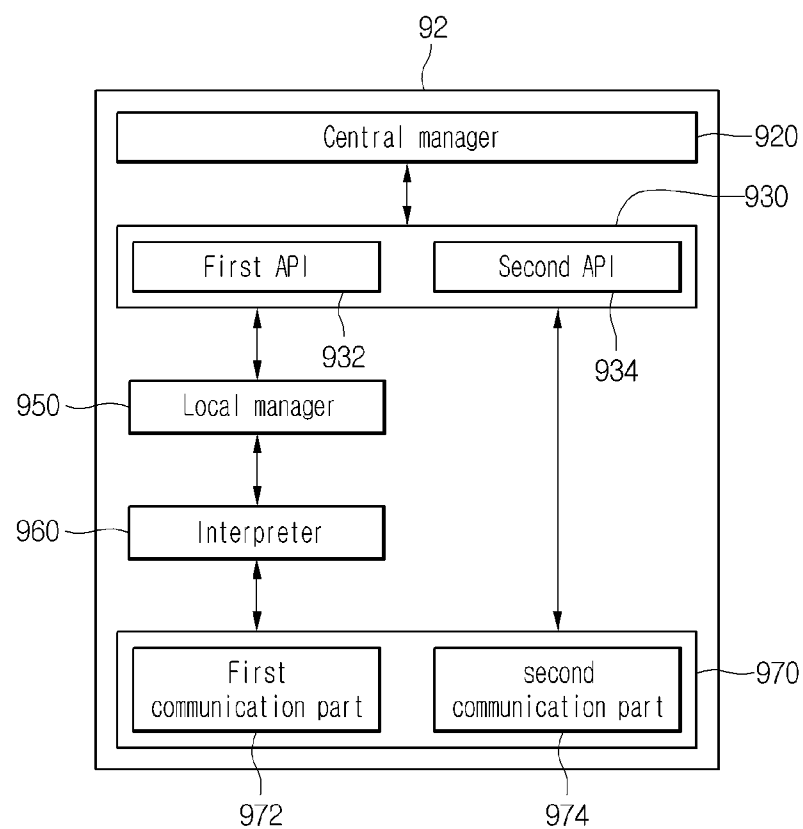
FIG. 11 is a block diagram showing the detailed configuration of a first component in FIG. 10.

FIG. 10 is a view showing the communication structure of components that constitute the network system according to a fourth embodiment. FIG. 11 is a block diagram showing the detailed configuration of a first component in FIG. 10.

Referring to FIGS. 10 and 11, the network system of this embodiment may include at least first to fourth components 92, 94, 96 and 98.

The first component 92 may communicate with the second to fourth components 94, 96 and 98. The fourth component 98 may communicate with the first to third components 92, 94 and 96.

Hereinafter, it will be described as an example that the first component 92 is a central management component (home server), the second and third components 94 and 96 are energy consumption components (electric home appliances), and the fourth component 98 is an energy metering component (smart meter).

The central management component (home server) may be understood as a component necessary for controlling at least a component that constitutes the HAN 20.

The first component 92 includes a communication unit 970 for performing communication with another component, a central manager 920 for managing the entire operation and/or information transmission/reception of the first component 92, and an application programming interface 930 (hereinafter, referred to as an "API") that serves as an interface between the communication unit 970 and the central manager 920 (specifically, application software).

The communication unit 970 may include a first communication component 972 for performing communication with the second to fourth components 94, 96 and 98, and a second communication component 974 for performing Internet communication.

The API 930 includes a first API 932 and a second API 934. The second API 934 is an interface between the central manager 920 and the second communication part 974, and the first API 930 is an interface between the first communication part 972 and the central manager 920.

The first component 92 further includes a local manager 950 and an interpreter 960. In a case where the information to be transmitted/received between the API 932 and the communication unit 970 is information related to operations of energy consumption components (electric home appliances), the local manager 950 outputs information corresponding to the respective energy consumption components. The interpreter 960 interprets information transmitted from the local manager 950 to the communication unit 970 or information received in the communication unit 970.

In this embodiment, the functions of the interpreter and the local manager are identical to those of the third embodiment, and therefore, their detailed descriptions will be omitted.

The information transmission process in the first component 92 will be described.

As an example, the first component 92 may receive energy information (e.g., energy reduction signal) from the fourth component 98 through the first communication part 972. Alternatively, the first component 92 may receive energy information from an external component connected to Internet through the second communication part 974.

The received energy information is transmitted directly to the first or second API 932 or 934 and then transmitted to the central manager 920. Since the energy information is information related to the energy consumption reduction of the energy consumption components, the central manager 920 transmits information related to the operations of the energy consumption components to the first API 932. As an example, the central manager 920 transmits information necessary for turning off power of a washing machine or refrigerator.

Then, the information is transmitted from the first API 932 to the local manager 950.

The local manager 950 transmits information for controlling the operation of each of the energy consumption components to the interpreter 960 based on the information transmitted from the first API 932. As an example, in a case where the information transmitted from the first API is information related to different kinds of energy consumption components, the local manager 950 transmits information related to the control of each of the energy consumption components to the interpreter 960.

Subsequently, the interpreter 960 interprets the information transmitted from the local manager 960 into a machine language (signal). Then, the interpreted signal is transmitted to the energy consumption components through the first communication part 972. Then, the energy consumption components are finally turned off so as to reduce energy.

Meanwhile, the second and third components 94 and 96 may transmit their own operation information to the first component 92. Since the information transmitted from the second and third components is information related to the operations of the energy consumption components, the signal received in the first communication part 972 is transmitted to the central manager 920 via the interpreter 960, the local manager 950 and the first API 932. In such an information transmission process, the information related to the first and second components is stored in the local manager 950.

The central manager 920 may transmit the received information to the first communication part 972. Then, the information of the second and third components 94 and 96 is transmitted to the fourth component 98.

The operation of the first component will be described. The information received through the communication unit 970 may be transmitted directly to the API 930, or may be converted (via the interpreter and the local manager) and then transmitted to the API 930, based on the kind of information (or the type of signal).

On the contrary, the information transmitted from the central manager 920 may be transmitted directly to the communication unit 970, or may be converted and then transmitted to the communication unit 970.

Meanwhile, in a case where the information transmitted to the API 930 through the second communication part 974 is information related to time-based pricing, the central manager 920 determines the presence of on-peak time. In the case of the on-peak time, the central manager 920 may transmit the information for controlling the operations of the energy consumption components to the API 930. Then, the information is transmitted to the energy consumption components through the local manager, the interpreter and the first communication part. In this case, the first component may be understood as an energy management component.

Although it has been described above that two energy consumption components communicate with the first component, the number of energy consumption components that communicate with the first component is not limited.

Although it has been described as an example that the first component is a home server, the first component may be an energy management component. In this case, the fourth component may be a central management component, an energy management component, a smart meter, or the like.

As another example, the first component may be a smart meter. In this case, the fourth component may be a central management component, an energy management component, or the like.

As still another example, the first component may be a terminal component (e.g., a gate way).

As still another example, each of the second and third components may be an energy generation component, an energy storage component or the like, which constitutes the HAN. That is, one or more of the energy generation component, the energy consumption component and the energy storage component may communicate with the first component. In addition to information related to the energy consumption component, information related to the energy generation component (e.g., information related to the operation of the energy generation component) and information related to the energy storage component (e.g., information related to the operation of the energy storage component) may be stored in the memory included in a local network or connected to the local network.

Although it has been described above that the first component performs Internet communication, the Internet communication may not be performed.

Although it has been described in the first embodiment that a single local manager is provided, a plurality of local managers may be provided. As an example, a first local manager may process information on an electric home appliance such as a refrigerator or washing machine, and a second local manager may process information on a display product such as a television or monitor.

Figure 12:
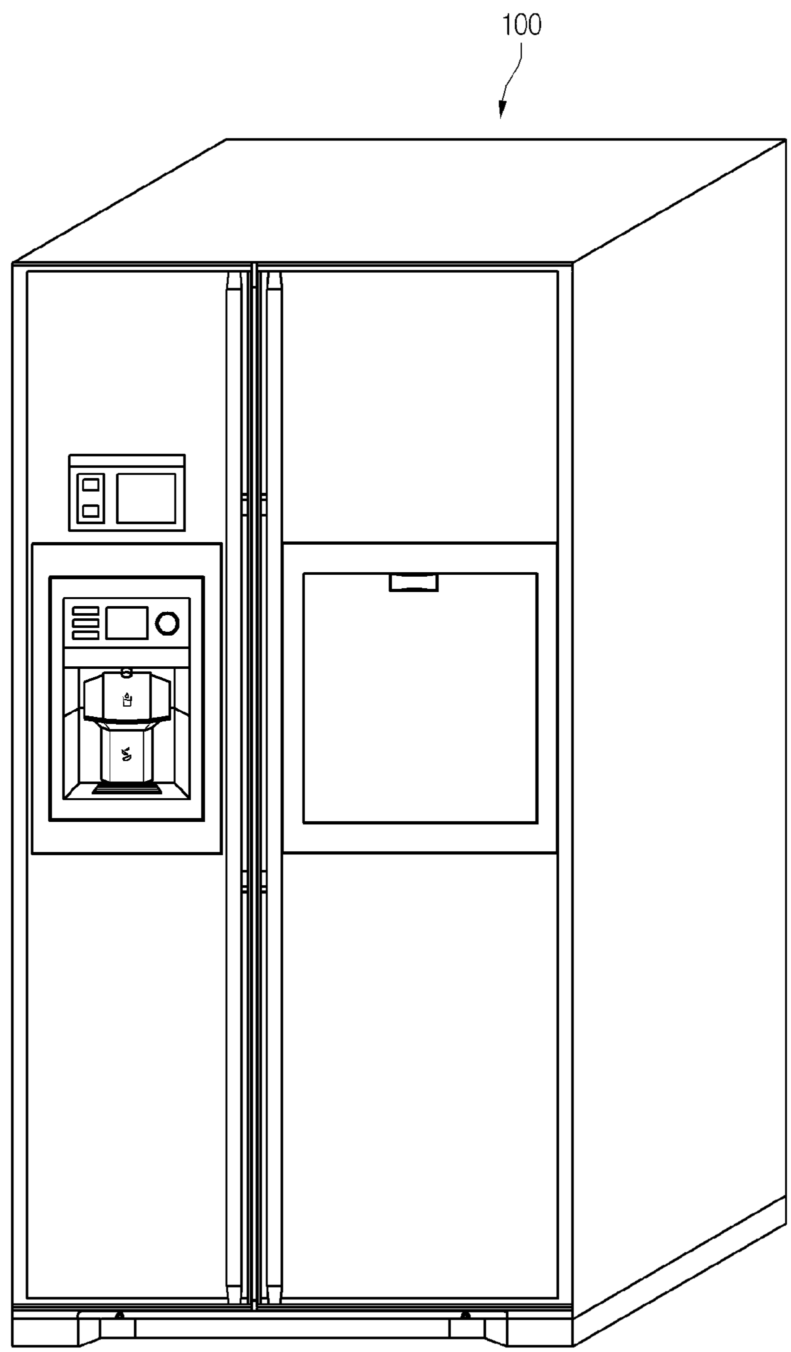
FIG. 12 is a perspective view illustrating a refrigerator as a component constituting a home network according to an embodiment.
Figure 13:
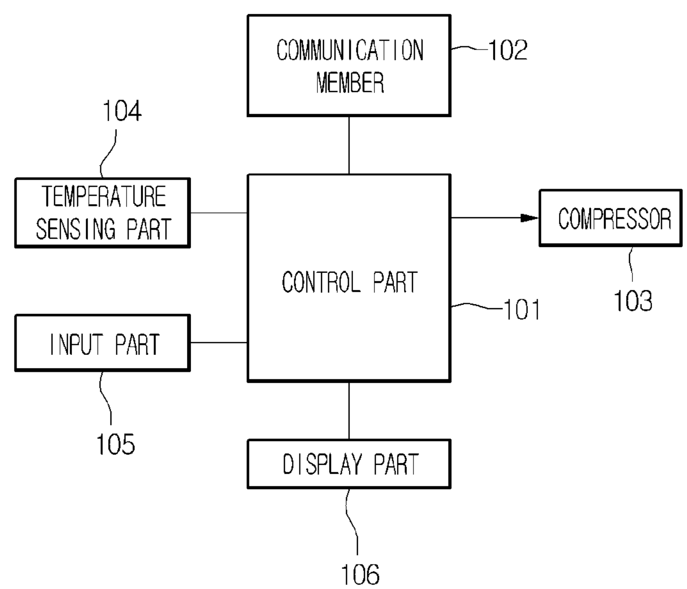
FIG. 13 is a block diagram illustrating a configuration of the refrigerator of FIG. 12.

FIG. 12 is a perspective view illustrating a refrigerator as a component constituting a home network according to an embodiment. FIG. 13 is a block diagram illustrating a configuration of the refrigerator of FIG. 12.

Referring to FIGS. 12 and 13, a refrigerator 100 constituting a home network may include a refrigerator component and a freezer component.

The refrigerator 100 may include: a control part 101; a compressor 103; a communication member 102; a temperature sensing part 104 that senses inner temperature of the refrigerator 100 (inner temperature of the refrigerator compartment or the freezer compartment); an input part 105 for inputting an operation condition; and a display part 106 for displaying at least one of an operation state, energy-related information, and addition information. Although not shown, the refrigerator 100 may include a condenser, an expansion device, and an evaporator to constitute a refrigerant cycle.

In particular, the inside of the refrigerator 100 may be maintained at a set temperature. To this end, for example, the compressor 103 may be repeatedly turned on and off. Hereinafter, a case that the freezer compartment of the refrigerator 100 is maintained at a predetermined temperature will be exemplified.

The communication member 102 may communicate with a component constituting a home network, or a utility network. Also, the communication member 102 may communicate with the control part 101. The control part 101 may receive at least one of first to third information pieces through the communication member 102.

For example, the control part 101 may recognize a high price section and a low price section, and differently control the compressor 103 according to whether the high price section is recognized or the low price section is recognized.

The input part 105 may be used to not only input an operation condition of the refrigerator 100, but also select a power saving mode.

Figure 14:
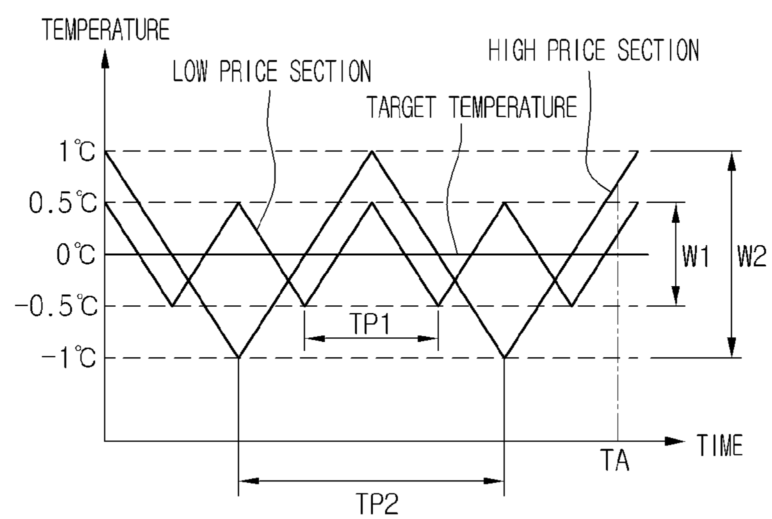
FIG. 14 is a graph illustrating variations of inner temperature of the refrigerator of FIG. 12 versus time when the refrigerator is in operation.
Figure 15:
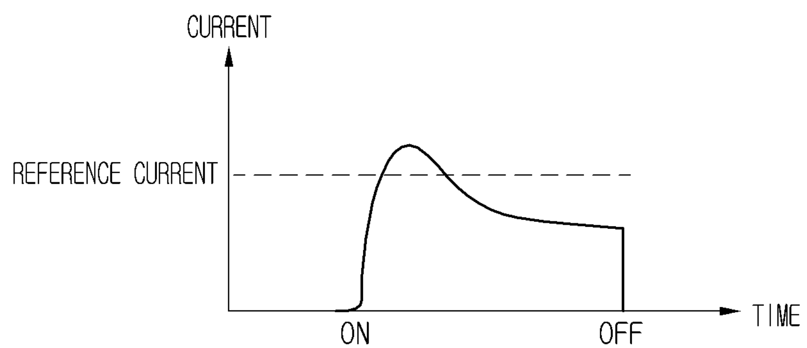
FIG. 15 is a graph illustrating an electric current variation according to on/off states of the compressor constituting the refrigerator of FIG. 12.

FIG. 14 is a graph illustrating variations of inner temperature of the refrigerator of FIG. 12 versus time when the refrigerator is in operation. FIG. 15 is a graph illustrating an electric current variation according to on/off states of the compressor constituting the refrigerator of FIG. 12.

Referring to FIGS. 14 and 15, the compressor 103 is repeatedly turned on and off to maintain the inside of the refrigerator 100 at a predetermined temperature (a target temperature or a target value). The compressor 103 is turned on at an upper limit higher than the target temperature, and is turned off at a lower limit lower than the target temperature.

That is, the target value is between the upper limit (a first reference value) and the lower limit (a second reference value), and an actual inner temperature of the refrigerator 100 may be varied therebetween. A width between the upper and lower limits in the high price section may be different from a width therebetween in the low price section. The upper and lower limits or the widths therebetween may be referred to as control references.

First, an operation (a normal mode) of the compressor 103 in the low price section will now be described.

A target temperature of the freezer compartment in the low price section may be set, e.g., to about zero degrees Celsius (hereinafter, temperature is expressed in Celsius). In this case, the upper limit and the lower limit may be set to about 0.5 degrees and about −0.5 degrees, respectively. Accordingly, a width W1 between the upper and lower limits is about 1 degree.

While the compressor 103 is operated, when the freezer compartment reaches about −0.5 degrees, the compressor 103 is turned off. After that, when the freezer compartment reaches about 0.5 degrees, the compressor 103 is turned on. That is, the compressor 103 is periodically turned on and off.

Referring to FIG. 15, when the compressor 103 is turned on from an off state, current (an input value input to the compressor 103) is quickly increases. After that, the compressor 103 is stabilized, and the current decreases. That is, when the compressor 103 is turned on, a current greater than a reference current (a reference value) flows therethrough, so as to increase power consumption, thereby increasing energy costs.

Thus, in order to decrease the energy costs (or the power consumption), it is needed to decrease the number of times that the compressor 103 is turned on (the number of times that the current is greater than the reference current).

When the control part 101 recognizes the high price section, at least one of the upper and lower limits may be varied in at least one portion of the high price section to decrease power consumption of the compressor 103 (or energy costs according to the power consumption). For example, a width between the upper and lower limits may be increased. The upper limit in the high price section may be varied to be greater than the upper limit in the low price section, or the lower limit in the high price section may be varied to be smaller than the lower limit in the low price section. Alternatively, the upper limit in the high price section may be varied to be greater than the upper limit in the low price section, and the lower limit in the high price section may be varied to be smaller than the lower limit in the low price section.

For example, when the target temperature is about zero degrees, the upper and lower limits in the high price section may be set to about 1 degree and −1 degree, respectively. In this case, a width W2 between the upper and lower limits is about 2 degrees.

While the compressor 103 is operated, when the freezer compartment reaches about −1 degree, the compressor 103 is turned off. After that, when the freezer compartment reaches about 1 degree, the compressor 103 is turned on.

Thus, referring to FIG. 14, an on-period (TP2) of the compressor 103 in the high price section is greater than an on-period (TP1) of the compressor 103 in the low price section. In other words, an off-period (TP2) of the compressor 103 in the high price section is greater than an off-period (TP1) of the compressor 103 in the low price section.

Thus, the number of times of on/off of the compressor 103 in the high price section for a period TA is smaller than the number of times of on/off of the compressor 103 in the low price section for the period TA.

As such, when the number of times of on of the compressor 103 is decreased in the high price section, the number of times that current applied to the compressor 103 exceeds the reference current is decreased, thereby decreasing power consumption and an electric charge according to the power consumption.

An increase of a width between the upper and lower limits may be varied depending on the length of the high price section. For example, an increase of a width between the upper and lower limits when the length of the high price section exceeds a reference period may be greater than an increase of a width between the upper and lower limits when the length of the high price section is shorter than the reference period.

For another example, when the control part 101 recognizes a plurality of differential pieces of price information (high, middle, and low price levels) in the form of schedule information or real-time information, increases of widths between the upper and lower limits may depend on price levels. For example, a width between the upper and lower limits may not be varied at the low price level. In addition, an increase of a width between the upper and lower limits at the high price level may be greater than an increase of a width between the upper and lower limits at the middle price level.

When the control part 101 recognizes real time pattern (RTP) information in the form of schedule information, increases of widths between the upper and lower limits may be set differently according to a plurality of differential periods.

According to the above embodiment, when a control part recognizes information for decreasing energy consumption and energy costs, power of a component that consumes energy is decreased, thereby decreasing energy consumption and the energy costs.

Accordingly, energy consumed by an electric product including the component and costs thereof may be decreased.

In addition, since an operation of a component that consumes energy is varied according to energy information such as a variable energy price, an energy source can be effectively managed.

According to the above embodiment, maintenance of a target temperature of a freezer compartment of a refrigerator is exemplified. However, the functions of electric products and components within the scope of the present disclosure are not limited thereto. In particular, a component of an electric product of may be periodically turned on/off for a predetermined period to maintain a specific target value (including a humidity value instead of a temperature value).

For example, one or more heaters of a cooking device may be turned on/off to maintain a cooking chamber at a temperature. Thus, an on/off period (an upper limit and/or a lower limit) of the heaters may be varied to maintain a target temperature according to a high price section or a low price section.

In addition, a compressor of an air conditioner may be turned on/off to maintain a target temperature. Thus, an air conditioner may be used within the spirit of the present disclosure. In addition, a heater of a water purifier in which hot water is stored may be turned on/off to maintain the hot water at a target temperature. Thus, a water purifier may be used within the spirit of the present disclosure. In addition, a fan motor of a dehumidifier may be turned on/off to maintain a set humidity value. Thus, a dehumidifier may be used within the spirit of the present disclosure.

According to the above embodiment, a component is turned off at an upper limit and is turned on at a lower limit. However, a component may be turned on at an upper limit and be turned off at a lower limit within the spirit of the present disclosure.

According to the above embodiment, a component is turned on/off based on upper and lower limits in order to maintain a target value. However, an on-time and an off-time of a component may be preset. In this case, when the component is controlled to maintain a target temperature, the on-time and/or the off-time may be varied (increased).

According to the above embodiment, the width between upper and lower limits is varied. However, at least one of upper and lower limits may be varied without changing the width therebetween.

In the present specification, a component operated for maintaining a target value may be referred to as a power consumer unit.

Various examples of a method of operating a component as described above will be described within the spirit of the present disclosure.

First, when a start command is input using an input part, optimal driving time information for a component or time-excluded information (driving method information) is determined (an optimal driving condition is determined). The optimal driving time information or the time-excluded information is determined to decrease the cost of electricity consumed by the component or consumption of power consumed thereby. The optimal driving time information may be determined as one of immediate driving at a current time point, driving at a selected time point, and delayed driving. When an optimal driving time point is later than a user recognition time point (the current time point), notification information may be displayed on a display part. Before the start command is input using the input part, a driving method or a driving time point may be input. The input driving method or driving time point may be varied or maintained according to a result of the determination of the optimal driving time information or the time-excluded information. That is, when a specific operation condition is input using the input part, an optimal driving condition of the component may be determined based on at least energy price-related information. In this case, the component is operated under the optimal driving condition. The display part may display the optimal driving condition, particularly, information changed from the specific operation condition, or information that is not input.

In another example of the method of operating a component, when at least one portion of a high price section overlaps a driving time period of a component, the driving time period may be changed. In particular, the driving time period may be defined by a driving start time point and a driving end time point. The change of the driving time period is a change of at least one of the driving start time point and the driving end time point. When the driving time period is changed, the component may be stopped in the at least one portion of the high price section. For example, when high price-related information is recognized during an operation of the component, the component may be immediately stopped. Alternatively, when the high price-related information is recognized during the operation of the component, the component may be operated for a predetermined period and then be stopped. When the high price section ends, the stopped component may be operated again. At least one portion of the driving time period may be changed. When the driving time period is changed, the driving end time point may be a time point when the high price-related information is recognized, or a time point before the high price-related information is recognized (that is, a time point included in a low price section prior to the high price section).

Alternatively, when the driving time period is changed, the driving end time point may be included in a low price section after the high price section. Alternatively, when the driving time period is changed, the driving start time point may be included in the low price section after the high price section.

In another example of the method of operating a component, when an operation mode is selected using an input part, a display part may display energy information related to the operation mode. For example, when a specific operation mode is selected, the display part may display electricity prices per unit power according to time periods, a total electric charge corresponding to the specific operation mode, and a total power consumption amount.

The component may be operated in one of various power saving modes. That is, the component may be operated in one of power saving modes to decrease an energy consumption amount or an energy charge at least according to types of energy information. The power saving modes may include a manual mode in which information for driving the component is manually selected, and an automatic mode in which information for driving the component is automatically selected. The component may be operated not only in a normal mode and a power saving mode, but also in a time saving mode. The time saving mode may be manually selected by a user. An operation period of the component in the time saving mode is shorter than an operation period of the component in the normal mode. In this case, an energy charge (or an energy consumption amount) in the time saving mode may be equal to or greater than an energy charge (or an energy consumption amount) in the normal mode. The energy charge (or the energy consumption amount) in the time saving mode may be varied by changing a method of operating the component. An operation period of the component in the power saving mode is equal to or longer than the operation period of the component in the normal mode. The normal mode, the time saving mode, and the power saving mode may be the same or similar to one another in terms of product performance (e.g., washing performance and cooking performance).

In another example of the method of operating a component, power saving modes may include modes differentiated according to degrees of decreasing an electric charge or a power consumption amount. For example, an electric charge or a power consumption amount of a component in a first power saving mode may be smaller than an electric charge or a power consumption amount of the component in a second power saving mode. Alternatively, the power saving modes may include at least two modes sharing a common control member or method in order to save power for driving the component. The power saving modes may be manually or automatically switched to one another. The power saving modes may control the component according to different methods. That is, methods of controlling the component in the power saving modes may be different from one another.

In another example of the method of operating a component, a component may recognize prediction power information related to power that is consumed by the component or another component. The prediction power information may be at least one of current information, voltage information, power information, power amount information, and electric charge information.

A memory part of the component may store the prediction power information corresponding to operation modes of the component or operation modes of another component. In this case, the prediction power information may be stored in a table form. For example, the memory part may store power consumption information corresponding to a selected course or mode, and a prediction electric charge may be determined by multiplying power consumption and a price. Alternatively, the memory part may store power consumption information of each of energy consumer parts constituting the component, and the prediction electric charge may be determined by multiplying the sum of power consumption amounts of energy consumer parts operated in a specific mode and a price corresponding to the specific mode.

The memory part of the component may store additional information, corresponding to operation modes of the component or operation modes of another component, e.g., performance information or efficiency information. Thus, when an operation mode of the component or an operation mode of another component is recognized, the component may recognize prediction power information corresponding to the operation mode. The recognized prediction power information may be displayed on the display part of the component or a display part of the another component. Actual power consumption amount information or actual electric charge information, generated when the component or the another component is operated, may be recognized and be used to correct the prediction power information. The display part of the component may display an actual power consumption amount or an actual charge while or after the component is operated. Alternatively, while the component is operated, prediction power information may be displayed, or prediction power information and actual usage information may be simultaneously displayed. An optimal time point or an optimal price within a specific time range may be determined based on the prediction power information stored in the memory part. The optimal time point may be an operation start time point of the component. The optimal price may be an energy charge generated while the component is operated for a specific period. When energy price information is real time information, the optimal price is determined based on previous energy price information stored in the memory part. After that, when an energy charge is changed, the optimal price may be corrected according to the change of the energy charge.

A user may select conditions to constitute an operation mode of the component, and prediction power information or additional information corresponding to the operation mode including the selected conditions may be displayed on the display part of the component. In this case, the operation mode (a user preference mode) may be stored in the memory part of the component, and be selected using the input part. For example, a user may arbitrarily set an operation mode of the component by using the input part, and prediction power information and additional information of the component in the set operation mode may be determined. The user may check the prediction power information and the additional information, and determine whether to set the set operation mode to a user preference mode.

In another example of the method of operating a component, a user may select conditions for operating components, and prediction power information or additional information corresponding to an operation mode including the selected conditions may be displayed on a display part of the component. In this case, the operation mode (a user preference mode) may be stored in the memory part of the component, and be selected using the input part. For example, a user may arbitrarily set an operation mode of a refrigerator, a washing machine, a water purifier, a cooking device, and an air conditioner by using the input part, and prediction power information and additional information of the component in the set operation mode may be determined. The user may check the prediction power information and the additional information, and determine whether to set the set operation mode to a user preference mode.

In another example of the method of operating a component, when a component recognizes energy information and addition information, the component may be operated based on priority information among the energy information and the addition information. The priority of the priority information may be automatically set, or manually set or changed. According to a first priority information state, it is determined whether to consider next priority information.

For example, energy price information as energy information may be priority information, and environmental information as additional information may be next priority information. In this case, the component may be operated based on the energy price information. For another example, energy information may be priority information, and additional information may be next priority information. In this case, when the energy information includes information related to a decrease of an energy consumption amount or energy price, the component may be operated based on only the energy information. For another example, additional information may be priority information, and energy information may be next priority information. In this case, when a result of determination of the additional information requires an increase of power or operation time of the component, the component may be operated in consideration of the energy information.

The component may include a memory part that stores operation methods reflecting a plurality of types of information. In this case, when the component recognizes the types of information, one of the operation methods stored in the memory part is selected.

In another example of the method of operating a component, a component may include a memory part that stores operation methods reflecting energy information and addition information. Thus, when a plurality of types of information is recognized, one of the operation methods stored in the memory part may be selected to operate the component.

In another example of the method of operating a component, while a component is operated, when high price-related information is recognized, operation information of the component may be stored in a memory part, and the component may be turned off or be stopped. After that, when low price-related information is recognized, the component may be operated again based on the operation information stored in the memory part.

In another example of the method of operating a component, while a component is operated, when high price-related information is recognized, the operation of the component may be varied based on information related to a previous operation of the component. The information related to the previous operation may be power consumption amount information of the component, energy charge information, a mean value of target values (target temperatures, target air volumes, target humidity values, or target dehumidification amounts) set for a specific period, or information related to a resource accommodated in the component when the component is operated for a specific period. The power consumption amount information or the energy charge information may be a mean power consumption amount or a mean energy charge while the component is operated once. The resource may be water or ice. The information related to the resource may be information related to a mean resource discharge amount for a specific period (a water discharge amount or an ice discharge amount of a water purifier or a refrigerator.

For example, when high price-related information is recognized, an operation of an energy consumer part of the component may be varied such that an energy consumption amount or energy price of the component is equal to or smaller than an information value related to a previous operation of the component.

In another example of the method of operating a component, a memory part of a component may store previous operation information of the component. The display part of the component may display a specific priority in a previous driving method. For example, energy consumption amount information or energy charge information, generated when a specific course of a washing machine is performed under a first condition and a second condition, may be stored in the memory part. The second condition is different in operation condition from the first condition, and is greater than the first condition in energy consumption amount or energy charge. Priorities of the first and second conditions may be determined and displayed on the display part. The priorities of the first and second conditions may be determined according to the priorities of energy charges or the priorities of the numbers of times of uses. Then, a first priority operation condition or a second priority operation condition may be stored in the memory part, and a driving method corresponding to the stored first or second priority operation condition may be selected by a user.

In another example of the method of operating a component, when an energy consumption amount or energy charge of a component according to an operation condition input by a user exceeds a limit, the component may be forcibly controlled to decrease the energy consumption amount or energy charge to be equal to or smaller than the limit, or the display part of the component may display a driving method of decreasing the energy consumption amount or energy charge to be equal to or smaller than the limit. Information, denoting the forcible control of the component, may be displayed on the display part.

In another example of the method of operating a component, while a component is operated according to a selected driving method, when high price-related information is recognized, the selected driving method may be varied or maintained according to the characteristics of the selected driving method. For example, when a prediction power consumption amount (or a prediction energy charge) of the component operated according to a selected driving method is greater than a prediction power consumption amount (or a prediction energy charge) of the component operated according to a standard driving method, the selected driving method may be changed into the standard driving method. When the prediction power consumption amount of the component operated according to the selected driving method is equal to or smaller than the prediction power consumption amount of the component operated according to the standard driving method, the selected driving method may be maintained. The standard driving method may be set when the component is fabricated, or be manually set or changed by a user. Alternatively, the standard driving method may include a plurality of methods, a specific method of which may be selected according to the type of low price-related information.

In another example of the method of operating a component, a component or one or more energy consumer parts constituting the component may be operated to reach a target value that may be varied depending on the type of energy-related information. The target value may be one of a temperature, a humidity value, an operation speed, an operation time period, an operation rate, a power value, an accumulated amount, and an energy charge. The target value may be input by a user, or be calculated according to a load applied to the component or the energy consumer parts by a user. For example, when a refrigerator or an air conditioner recognizes high price-related information, a target temperature value may be increased. On the contrary, when a cooking device recognizes high price-related information, a target temperature value may be decreased. When a washing machine recognizes high price-related information, a target rotation speed of a motor or an operation rate of a heater may be decreased. As such, since a target value is varied, an energy consumption amount or energy charge according to an operation of a component or energy consumer part is decreased in a section where high price-related information is recognized.

In another example of the method of operating a component, selection of an energy decease degree (a power consumption amount decrease degree or an electricity price decrease degree) may be varied depending on the type or state of energy information or additional information. For example, the selection of an energy decease degree may be varied based on a level, corresponding to the energy information or additional information, or the length of a time period where a value corresponding to the energy information or additional information is greater than a reference information value. A power consumption amount decrease degree or an electricity price decrease degree, determined when the value corresponding to the energy information or additional information is greater than the reference information value, is greater than a power consumption amount decrease degree or an electricity price decrease degree determined when the value corresponding to the energy information or additional information is smaller than the reference information value. The reference information value may be set to a plurality of values. In this case, at least one of the reference information values may be a value determining an on-peak time period. In particular, lengths of the on-peak time period may be classified into, e.g., upper, middle, and lower levels. A decrease degree determined when a length of the on-peak time period is the upper level is greater than a decrease degree determined when a length of the on-peak time period is the middle or lower level. When electricity prices are classified into a plurality of levels, an energy decrease degree corresponding to a high electricity price is greater than an energy decrease degree corresponding to a low electricity price.

In another example of the method of operating a component, selection of an energy decrease method may be varied depending on the type or state of energy information or additional information. For example, a component may be a refrigerator, and an on-peak time period may be within a first reference value. In this case, a compressor may be turned off (which is a first method). When the on-peak time period is within the first reference value and a second reference value greater than the first reference value, cooling performance of the compressor may be varied (which is a second method). When the on-peak time period is equal to or greater than a third reference value greater than the second reference value, a target temperature of a storage compartment may be increased (which is a third method). A decrease method may be varied in a section where high price-related information is recognized. High price-related information may be recognized, and the first method may be performed. In this state, when a predetermined period is elapsed, one of the second and third methods may be performed or the second and third methods may be sequentially performed.

In another example of the method of operating a component, when a component includes a plurality of energy consumer parts, selection of an energy consumer part to be controlled may be varied depending on the type or state of energy information or additional information. For example, the selection of an energy consumer part to be controlled may be varied according to energy price values or energy price levels. In this case, a reference information value may include a first reference information value and a second reference information value greater than the first reference information value. Alternatively, the reference information value may include only a value. When a value corresponding to the energy information or additional information is greater than the second reference information value, power of a first energy consumer part (a component that consumes energy) is adjusted (operation limitation). When the value corresponding to the energy information or additional information is between the first and second reference information values, power of a second energy consumer part (a component that consumes energy) is adjusted (operation limitation). When the value corresponding to the energy information or additional information is smaller than the first reference information value, electricity may be stored in an energy storage part (an operation of an energy storage component may be started). That is, any one of control targets or control methods may be selected according to the type or state of energy information or additional information.

In another example of the method of operating a component, while a component is operated, when high price-related information is recognized, total power of energy consumer parts constituting the component and performing the same function may be decreased. The energy consumer parts may be the same or different in type. When the high price-related information is recognized, part of the energy consumer parts may be turned off or power thereof may be decreased. Alternatively, when the high price-related information is recognized, respective power of the energy consumer parts may be decreased with the energy consumer parts maintained at an on-state. Alternatively, when the high price-related information is recognized, respective power of the energy consumer parts may be decreased by the same amount or the same power decrease ratio. Alternatively, when the high price-related information is recognized, respective power of the energy consumer parts may be decreased by different amounts or different power decrease ratios. Alternatively, when the high price-related information is recognized, the energy consumer parts may be alternately turned on and off.

In another example of the method of operating a component, while a component is operated, when high price-related information is recognized, the function of at least one of energy consumer parts constituting the component may be limited, and the function of the other(s) of the energy consumer parts may be performed. A power consumption amount of the energy consumer part with the function limited is greater than a power consumption amount of the energy consumer part with the function performed. For example, while a high power component is operated, when high price-related information is recognized, a high power energy consumer part may be turned off, and a low power energy consumer part may be turned on.

In another example of the method of operating a component, while a component is operated, when high price-related information is recognized, the operation of one of energy consumer parts constituting the component, particular, the operation of an energy consumer part satisfying a limitation condition may be limited. The limitation condition may be a power consumption amount, an energy charge, or limitation priority order. That is, among the energy consumer parts, the operation of an energy consumer part having a power consumption amount or energy charge exceeding a reference value may be limited. Alternatively, among the energy consumer parts, the operation of an energy consumer part having a relatively high power consumption amount may be limited.

In another example of the method of operating a component, when an operation mode of a component includes a plurality of processes, at least one of the processes is limited in a section where high price-related information is recognized. The limitation of the process means a stop of the process or a decrease of a power consumption amount during the process. For example, when the component is a washing machine, the operation mode may be a standard course, a blanket course, or a wool course, and the processes may include at least one of soaking, washing, rinsing, dehydrating, and drying processes. The limitation of the process may be automatically set, or manually set or changed.

In another example of the method of operating a component, while a component is operated, when high price-related information is recognized, two or more factors of factors related to the operations of one or more energy consumer parts (components that perform functions) constituting the component may be varied. The factors may include an operation speed, an operation time period, power, and an operation rate. When a value related to one of the two or more factors is decreased, a value related to another factor may be increased. For example, when an energy consumer part is a motor, a rotation speed of the motor may be decreased, and a rotation time period thereof may be increased. When an energy consumer part is a heater, power of the heater may be decreased, and an operation time period thereof may be increased. That is, when high price-related information is recognized, two or more factors related to the operations of one or more energy consumer parts may be varied. When an energy consumer part is a motor, an operation pattern of the motor may be varied. In particular, when a motor rotates a drum of a washing machine, the motor may be rotated in a forward direction or a reverse direction. The motor is controlled to lift a laundry target and then drop the laundry target. Driving motions of the drum may be different according to rotation speeds of the motor and rotation angles of the motor in a specific direction. The driving motions may include a normal driving motion and one or more special driving motions (which are greater than the normal driving motion in rotation angle of a rotation operation or rotation speed). A power consumption amount of the motor during a special driving motion is greater than a power consumption amount of the motor during the normal driving motion. When high price-related information is recognized in a special driving motion, the washing machine may perform the normal driving motion. When low price-related information is recognized during the normal driving motion, the washing machine performs a specific motion set to be performed when low price-related information is recognized.

In another example of the method of operating a component, only when a period (e.g., an on-peak time period) when high price-related information is recognized exceeds a reference time point, a control operation may be performed to decrease energy consumed by a component. Alternatively, the control operation may be performed just after the high price-related information is recognized. In this case, after the control operation may be performed for a predetermined period, it may be determined again whether the high price-related information is recognized, to determine whether a current state is maintained. This prevents a component operation method from being frequently varied.

In another example of the method of operating a component, a component may receive energy from a plurality of energy generator parts. In particular, the energy generator parts may be different utility networks. In this case, a ratio of energy transmitted from the energy generator parts may be varied depending on energy information. That is, when an energy price of a first energy generator part is lower than that of a second energy generator part, the first energy generator part may supply a larger amount of energy to the component. In this case, an amount or ratio of energy supplied from the energy generator parts may be displayed on a display part of the component. Alternatively, one of the energy generator parts may constitute a utility network, and another one of the energy generator parts may constitute a home network. Also in this case, a ratio of energy transmitted from the energy generator parts may be varied depending on energy information. Alternatively, the component may receive energy from one of the energy generator parts. For example, the component may compare a prediction power consumption amount with an amount of energy supplied from the energy generator parts, to receive energy from one or more energy generator parts selected from the energy generator parts.

In another example of the method of operating a component, a component may have a plurality of spaces that may be cooled or heated. The cooling or heating of the spaces may be varied depending on the type or state of recognized energy information. For example, when high price-related information is recognized, one or more of the spaces may not be cooled or heated. Alternatively, priorities of the spaces may be determined, and thus, the spaces may be sequentially cooled or heated in priority order. The priorities of the spaces may be set by a user, or be automatically set. When high price-related information is recognized, heat or cool air may be transferred from one of the spaces to another space. For example, when high price-related information is recognized, heat may be supplied from a cooking chamber to a heat conservation chamber for keeping food warm.

According to the embodiments, an energy source can be effectively managed.

What is claimed is:

1. An energy consumption component capable of communicating with a network system, comprising:

a power consumer unit;

a control part that controls the power consumer unit, the control part recognizing energy information including a high price section and a low price section; and a communication part to receive energy information and that communicates with the control part, wherein the control part determines optimal driving time of the power consumer unit based on an input value;

wherein a number of times that the input value exceeds a preset reference value is equal to or greater than a predetermined number, and the control part decreases the number of times that the input value exceeds the preset reference value for a specific time period based on the recognized information.

2. The component according to claim 1, wherein the power consumer unit that is controlled to maintain a target value between an upper limit value and lower limit value, wherein the control part varies functioning of the power consumer unit such that an off-period in the high price section is greater than an off-period in the low price section.

3. The component according to claim 2, wherein the control part turns on the power consumer unit when reaching the upper limit value, and turns off the power consumer unit when reaching the lower limit value.

4. The component according to claim 3, wherein the control part increases a difference between the upper and lower limit values in the high price section.

5. The component according to claim 4, wherein the control part varies the difference between the upper and lower limit values based on a duration of the high price section.

6. The component according to claim 2, wherein the target reference value comprises a temperature value or a humidity value.

7. The component according to claim 2, wherein the component is a refrigerator, and the power consumer unit is a compressor.

8. The component according to claim 7, wherein the control part repeatedly turns the compressor on and off to maintain the refrigerator at the target reference value, the target reference value being a predetermined temperature.

9. The component according to claim 1, wherein the component is a cooking device, and the power consumer unit is a heater.

10. The component according to claim 1, wherein the component is an air conditioner, and the power consumer unit is a compressor.

11. The component according to claim 1, wherein the control part turns the power consumer unit on and off a plurality of times.

12. An energy consumption component capable of communicating with a network system, comprising:

a power consumer unit that maintains a target value within a width between a first reference value and second reference value; and a control part that recognizes information and controls the power consumer unit, wherein the control part varies the width depending on the information by varying at least one of the first and second reference values, wherein the control part determines optimal driving time of the power consumer unit based on an input value;

wherein a number of times that the input value exceeds a preset reference value is equal to or greater than a predetermined number, and the control part decreases the number of times that the input value exceeds the preset reference value for a specific time period based on the recognized information.

13. The component according to claim 12, wherein when the recognized information is high price section information, the control part reduces the number of times that the input value exceeds the preset reference value in a high price section that is smaller than the number of times that the input value exceeds the preset reference value in a low price section.

14. The component according to claim 12, wherein the input value comprises a value corresponding to electric current applied to the power consumer unit to drive the power consumer unit.

15. The component according to claim 12, wherein the information is energy information comprising energy price information.

16. The component according to claim 12, wherein the information comprises one of a decrease of energy, an emergency, a network safety, an increase of energy, operation priority order, and an energy consumption amount.

* * * * *